United States Patent
Zhou et al.

(10) Patent No.: US 11,677,455 B2
(45) Date of Patent: Jun. 13, 2023

(54) CRITERIA SELECTION FOR BEAM FAILURE DETECTION

(71) Applicant: QUALCOMM Incorporated, San Diego, CA (US)

(72) Inventors: Shanyu Zhou, San Diego, CA (US); Jelena Damnjanovic, Del Mar, CA (US); Peter Gaal, San Diego, CA (US); Junyi Li, Fairless Hills, PA (US)

(73) Assignee: QUALCOMM Incorporated, San Diego, CA (US)

(*) Notice: Subject to any disclaimer, the term of this patent is extended or adjusted under 35 U.S.C. 154(b) by 29 days.

(21) Appl. No.: 17/344,656

(22) Filed: Jun. 10, 2021

(65) Prior Publication Data
US 2022/0399925 A1    Dec. 15, 2022

(51) Int. Cl.
| | |
|---|---|
| *H04B 7/06* | (2006.01) |
| *H04W 24/10* | (2009.01) |
| *H04W 80/02* | (2009.01) |
| *H04B 17/318* | (2015.01) |
| *H04B 17/336* | (2015.01) |

(52) U.S. Cl.
CPC ......... *H04B 7/0695* (2013.01); *H04B 17/318* (2015.01); *H04B 17/336* (2015.01); *H04W 24/10* (2013.01); *H04W 80/02* (2013.01)

(58) Field of Classification Search
CPC .. H04B 7/0695; H04B 17/318; H04B 17/336; H04W 24/10; H04W 80/02
See application file for complete search history.

(56) References Cited

U.S. PATENT DOCUMENTS

| | | | | |
|---|---|---|---|---|
| 11,252,586 | B2* | 2/2022 | Kwon | H04B 7/0695 |
| 2019/0200249 | A1* | 6/2019 | Yoon | H04L 5/0023 |
| 2020/0107353 | A1* | 4/2020 | Jung | H04L 5/0053 |
| 2020/0366326 | A1* | 11/2020 | Jassal | H04L 41/16 |
| 2021/0184812 | A1* | 6/2021 | MolavianJazi | H04W 72/048 |
| 2023/0006727 | A1* | 1/2023 | Jang | H04B 7/0408 |

* cited by examiner

*Primary Examiner* — Deepa Belur
(74) *Attorney, Agent, or Firm* — Arun Swain; Holland & Hart LLP

(57) ABSTRACT

Methods, systems, and devices for wireless communications are described. A user equipment (UE) may use the techniques described herein to efficiently detect beam failure. In one aspect, the UE may autonomously select one or more criteria for detecting beam failure. The UE may then perform measurements on beam failure detection reference signals received from the base station and use the selected one or more criteria to detect beam failure. Because the UE may select the one or more criteria without signaling from the base station, control overhead between the UE and the base station may be reduced.

30 Claims, 13 Drawing Sheets

CRITERIA SELECTION FOR BEAM FAILURE DETECTION

FIELD OF TECHNOLOGY

The following relates to wireless communications, including criteria selection for beam failure detection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a UE may communicate with a base station using one or more beams. In such systems, it may be appropriate for the UE to support techniques for detecting beam failure.

SUMMARY

The described techniques relate to improved methods, systems, devices, and apparatuses that support criteria selection for beam failure detection. A UE may use the techniques described herein to detect beam failure. In one aspect, the UE may autonomously select one or more criteria for detecting beam failure. The UE may then perform measurements on beam failure detection reference signals received from the base station and use the selected one or more criteria to detect beam failure. Because the UE may select the one or more criteria without signaling from the base station (or with less signaling from the base station), control overhead between the UE and the base station may be reduced. Further, because the UE may not have to wait for control signaling from the base station to detect beam failure, processing delays associated with detecting beam failure may be reduced. In some cases, to further improve the flexibility of beam management at the UE, the base station may signal a level of autonomy with which the UE is to manage beam failure detection operations. In such cases, each UE may be able to manage beam failure detection operations based on its capabilities.

A method for wireless communication at a UE is described. The method may include selecting, by the UE, one or more criteria for detecting beam failure of a beam associated with the UE, performing measurements on one or more beam failure detection reference signals received from a base station and associated with the beam based on the selected one or more criteria, and sending, from a physical layer at the UE to a medium access control layer at the UE, an indication used to identify beam failure based on the measurements performed on the one or more beam failure detection reference signals.

An apparatus for wireless communication at a UE is described. The apparatus may include a processor, memory coupled with the processor, and instructions stored in the memory. The instructions may be executable by the processor to cause the apparatus to selecting, by the UE, one or more criteria for detect beam failure of a beam associated with the UE, perform measurements on one or more beam failure detection reference signals received from a base station and associated with the beam based on the selected one or more criteria, and send, from a physical layer at the UE to a medium access control layer at the UE, an indication used to identify beam failure based on the measurements performed on the one or more beam failure detection reference signals.

Another apparatus for wireless communication at a UE is described. The apparatus may include means for selecting, by the UE, one or more criteria for detecting beam failure of a beam associated with the UE, means for performing measurements on one or more beam failure detection reference signals received from a base station and associated with the beam based on the selected one or more criteria, and means for sending, from a physical layer at the UE to a medium access control layer at the UE, an indication used to identify beam failure based on the measurements performed on the one or more beam failure detection reference signals.

A non-transitory computer-readable medium storing code for wireless communication at a UE is described. The code may include instructions executable by a processor to selecting, by the UE, one or more criteria for detect beam failure of a beam associated with the UE, perform measurements on one or more beam failure detection reference signals received from a base station and associated with the beam based on the selected one or more criteria, and send, from a physical layer at the UE to a medium access control layer at the UE, an indication used to identify beam failure based on the measurements performed on the one or more beam failure detection reference signals.

Some examples of the method, apparatuses, and non-transitory computer-readable medium described herein may further include operations, features, means, or instructions for receiving, from the base station, an indication of a level of autonomy with which the UE may be to manage beam failure detection operations.

In some examples of the method, apparatuses, and non-transitory computer-readable medium described herein, receiving the indication of the level of autonomy may include operations, features, means, or instructions for receiving the indication of the level of autonomy via downlink control information or a medium access control element.

Some examples of the method, apparatuses, and non-transitory computer-readable medium described herein may further include operations, features, means, or instructions for transmitting, to the base station, an indication of a capability of the UE for applying the one or more criteria to the measurements to detect beam failure, where receiving the indication of the level of autonomy may be based on the capability of the UE.

In some examples of the method, apparatuses, and non-transitory computer-readable medium described herein, selecting the one or more criteria for detecting beam failure may include operations, features, means, or instructions for selecting one or more thresholds associated with a signal-to-interference-plus-noise ratio, one or more thresholds associated with a signal-to-noise ratio, one or more thresholds associated with a reference signal received power parameter, one or more thresholds associated with a received signal strength indicator, one or more thresholds associated with a pathloss parameter, or one or more thresholds associated with an interference parameter for detecting beam failure, or any combination of thresholds thereof for any combination of parameters thereof.

In some examples of the method, apparatuses, and non-transitory computer-readable medium described herein, sending the indication used to identify beam failure may include operations, features, means, or instructions for sending, from the physical layer to the medium access control layer, a beam failure indicator based on the measurements performed on the one or more beam failure detection reference signals satisfying the one or more criteria.

Some examples of the method, apparatuses, and non-transitory computer-readable medium described herein may further include operations, features, means, or instructions for determining, at the physical layer, the beam failure indicator for the beam based on the measurements performed on the one or more beam failure detection reference signals satisfying the one or more criteria, where sending the beam failure indicator may be based on the determining.

In some examples of the method, apparatuses, and non-transitory computer-readable medium described herein, determining the beam failure indicator may include operations, features, means, or instructions for determining the beam failure indicator using a machine learning algorithm taking the measurements performed on the one or more beam failure detection reference signals as inputs and generating the beam failure indicator as an output.

In some examples of the method, apparatuses, and non-transitory computer-readable medium described herein, determining the beam failure indicator may include operations, features, means, or instructions for determining whether the measurements satisfy the one or more criteria, the beam failure indicator including a binary value indicating whether the measurements satisfy the one or more criteria.

In some examples of the method, apparatuses, and non-transitory computer-readable medium described herein, determining the beam failure indicator may include operations, features, means, or instructions for determining a value for each measurement of the measurements compared with the one or more criteria and determining a non-binary value based on the value for each measurement of the measurements compared with the one or more criteria, the beam failure indicator including the non-binary value.

Some examples of the method, apparatuses, and non-transitory computer-readable medium described herein may further include operations, features, means, or instructions for identifying, at the physical layer, a type of the beam failure indicator based on the selected one or more criteria, where sending the indication includes sending the type of the beam failure indicator.

In some examples of the method, apparatuses, and non-transitory computer-readable medium described herein, identifying the type of the beam failure indicator may include operations, features, means, or instructions for identifying the type of the beam failure indicator using a machine learning algorithm taking the measurements performed on the one or more beam failure detection reference signals as inputs and generating the type of the beam failure indicator as an output.

In some examples of the method, apparatuses, and non-transitory computer-readable medium described herein, the type of the beam failure indicator includes a first type of beam failure indicator associated with a signal condition of the beam or a second type of beam failure indicator associated with interference applied to the beam.

In some examples of the method, apparatuses, and non-transitory computer-readable medium described herein, the first type of beam failure indicator indicates a strength of a channel between the UE and the base station and the second type of beam failure indicator indicates interference between the UE and the base station.

In some examples of the method, apparatuses, and non-transitory computer-readable medium described herein, sending the indication may include operations, features, means, or instructions for sending, from the physical layer to the medium access control layer, the measurements performed on the one or more beam failure detection reference signals.

Some examples of the method, apparatuses, and non-transitory computer-readable medium described herein may further include operations, features, means, or instructions for determining, at the medium access control layer, a beam failure indicator for the beam based on the measurements received from the physical layer.

In some examples of the method, apparatuses, and non-transitory computer-readable medium described herein, determining the beam failure indicator may include operations, features, means, or instructions for determining the beam failure indicator using a machine learning algorithm taking the measurements received from the physical layer as inputs and generating the beam failure indicator as an output.

In some examples of the method, apparatuses, and non-transitory computer-readable medium described herein, determining the beam failure indicator may include operations, features, means, or instructions for determining whether the measurements satisfy the one or more criteria, the beam failure indicator including a binary value indicating whether the measurements satisfy the one or more criteria.

In some examples of the method, apparatuses, and non-transitory computer-readable medium described herein, determining the beam failure indicator may include operations, features, means, or instructions for determining a value for each measurement of the measurements compared with the one or more criteria and determining a non-binary value based on the value for each measurement of the measurements compared with the one or more criteria, the beam failure indicator including the non-binary value.

Some examples of the method, apparatuses, and non-transitory computer-readable medium described herein may further include operations, features, means, or instructions for identifying, at the medium access control layer, a type of the beam failure indicator based on the selected one or more criteria.

In some examples of the method, apparatuses, and non-transitory computer-readable medium described herein, identifying the type of the beam failure indicator may include operations, features, means, or instructions for identifying the type of the beam failure indicator using a machine learning algorithm taking the measurements received from the physical layer as input and generating the type of the beam failure indicator as an output.

In some examples of the method, apparatuses, and non-transitory computer-readable medium described herein, the type of the beam failure indicator includes a first type of beam failure indicator associated with a signal condition of the beam or a second type of beam failure indicator associated with interference applied to the beam.

In some examples of the method, apparatuses, and non-transitory computer-readable medium described herein, the first type of beam failure indicator indicates a strength of a channel between the UE and the base station and the second type of beam failure indicator indicates interference between the UE and the base station.

A method for wireless communication at a base station is described. The method may include transmitting, to a UE, an indication of a level of autonomy with which the UE is to manage beam failure detection operations, transmitting, to the UE, one or more beam failure detection reference signals associated with a beam used for communications with the UE, and receiving, from the UE, a beam failure report based on transmitting the indication of the level of autonomy and the one or more beam failure detection reference signals.

An apparatus for wireless communication at a base station is described. The apparatus may include a processor, memory coupled with the processor, and instructions stored in the memory. The instructions may be executable by the processor to cause the apparatus to transmit, to a UE, an indication of a level of autonomy with which the UE is to manage beam failure detection operations, transmit, to the UE, one or more beam failure detection reference signals associated with a beam used for communications with the UE, and receive, from the UE, a beam failure report based on transmitting the indication of the level of autonomy and the one or more beam failure detection reference signals.

Another apparatus for wireless communication at a base station is described. The apparatus may include means for transmitting, to a UE, an indication of a level of autonomy with which the UE is to manage beam failure detection operations, means for transmitting, to the UE, one or more beam failure detection reference signals associated with a beam used for communications with the UE, and means for receiving, from the UE, a beam failure report based on transmitting the indication of the level of autonomy and the one or more beam failure detection reference signals.

A non-transitory computer-readable medium storing code for wireless communication at a base station is described. The code may include instructions executable by a processor to transmit, to a UE, an indication of a level of autonomy with which the UE is to manage beam failure detection operations, transmit, to the UE, one or more beam failure detection reference signals associated with a beam used for communications with the UE, and receive, from the UE, a beam failure report based on transmitting the indication of the level of autonomy and the one or more beam failure detection reference signals.

Some examples of the method, apparatuses, and non-transitory computer-readable medium described herein may further include operations, features, means, or instructions for receiving, from the UE, an indication of a capability of the UE for applying one or more criteria to detect beam failure, where transmitting the indication of the level of autonomy may be based on the capability of the UE.

In some examples of the method, apparatuses, and non-transitory computer-readable medium described herein, transmitting the indication of the level of autonomy may include operations, features, means, or instructions for transmitting the indication of the level of autonomy via downlink control information or a medium access control control element.

DETAILED DESCRIPTION

In some wireless communications systems, a user equipment (UE) may communicate with a base station using one or more beams. In such systems, it may be appropriate for the UE to support techniques for detecting beam failure. To facilitate beam failure detection at the UE, a base station may configure the UE with one or more thresholds against which to compare measurements to detect beam failure. In particular, the UE may perform measurements on beam failure detection reference signals (BFD-RSs) received from the base station, and the UE may compare the measurements to the one or more thresholds to detect beam failure. Because, the base station may configure the UE with the one or more thresholds, and the base station may configure the BFD-RSs, in addition to other aspects of a beam management procedure, the base station may be responsible for facilitating a large portion of the beam management procedure at the UE. As a result, the control overhead associated with facilitating beam management at the UE may be high. Further, because the UE may wait to receive control signaling from the base station before attempting to detect beam failure, the UE may experience significant processing delays.

As described herein, a wireless communications system may support efficient techniques to facilitate beam failure detection at a UE. In one aspect, the UE may autonomously select one or more criteria for detecting beam failure. The UE may then perform measurements on BFD-RSs received from the base station and use the selected one or more criteria to detect beam failure. Because the UE may select the one or more criteria without signaling from the base station (or with less signaling from the base station), control overhead between the UE and the base station may be reduced. Further, because the UE may not have to wait for control signaling from the base station to detect beam failure, processing delays associated with detecting beam failure may be reduced. In some cases, to further improve the flexibility of beam management at the UE, the base station may signal a level of autonomy with which the UE is to manage beam failure detection operations. In such cases, each UE may be able to manage beam failure detection operations based on its capabilities.

Aspects of the disclosure are initially described in the context of wireless communications systems. Examples of processes and signaling exchanges that support criteria selection for beam failure detection are then described. Aspects of the disclosure are further illustrated by and described with reference to apparatus diagrams, system diagrams, and flowcharts that relate to criteria selection for beam failure detection.

Figure 1:
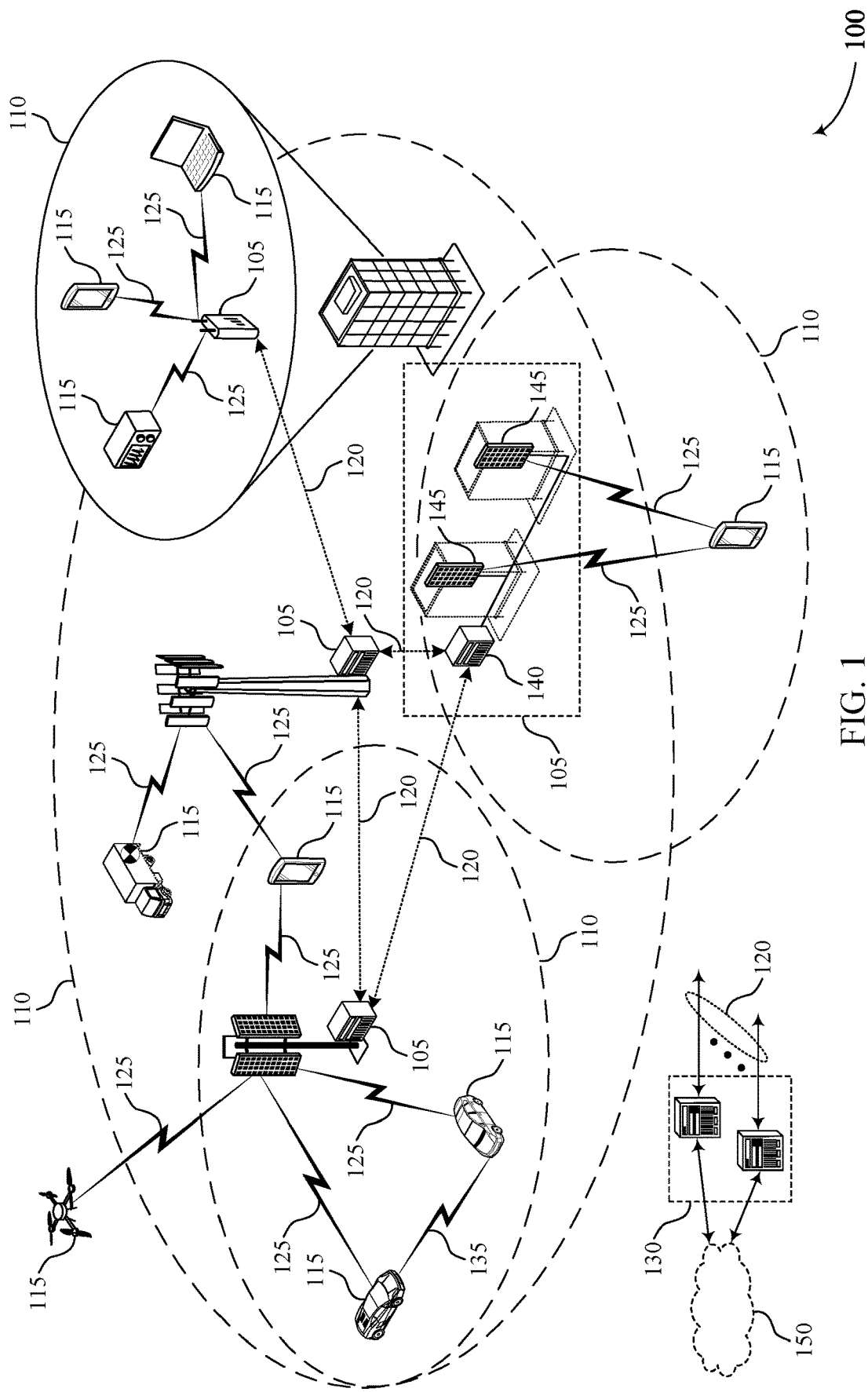
FIG. 1 illustrates an example of a wireless communications system that supports criteria selection for beam failure detection in accordance with aspects of the present disclosure.

FIG. 1 illustrates an example of a wireless communications system 100 that supports criteria selection for beam failure detection in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical (PHY) layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

As mentioned above, in wireless communications system 100, a UE 115 may communicate with a base station 105 using one or more beams. Accordingly, it may be appropriate for the UE 115 to support beam management procedures to, for example, detect beam failure. In one example, as part of a beam management procedure, the UE 115 may receive an indication of a threshold against which to compare measurements (e.g., a signal-to-interference-plus-noise ratio (SINR)) to detect beam failure. The UE 115 may then perform measurements on BFD-RSs received from the base station 105 (e.g., periodic BFD-RSs) and determine, at a PHY layer at the UE 115, whether the measurements satisfy the threshold.

If the measurements fail to satisfy the threshold, a PHY layer at the UE 115 may send a beam failure indicator (BFI) to a MAC layer at the UE 115. Thus, the threshold configured by the base station 105 used to compare measurements may be referred to as BFI determination criteria. In some examples, the threshold may be a block error rate (BLER) threshold (e.g., 10% BLER), and a trigger condition for sending the BFI may be related to an estimated BLER satisfying the BLER threshold. The MAC layer may keep a count of the BFIs received from the PHY layer, and, if the quantity of BFIs received from the PHY layer satisfies a threshold, the MAC layer may trigger the UE 115 to transmit a beam failure report to the base station 105.

Because the base station 105 may configure the BFI determination criteria (i.e., the threshold), the BFD-RSs, etc., and the UE 115 may perform beam failure detection operations according to signaling instructions from the base station 105, the base station 105 may control the UE 115 in BFI related procedures. In some cases, the base station 105 may also switch configurations (e.g., BFI determination criteria, BFD-RSs configurations, etc.) when appropriate. As a result, the control overhead associated with facilitating beam management at the UE 115 may be high. Further, because the UE 115 may wait to receive control signaling from the base station 105 before attempting to detect beam failure, the UE 115 may experience processing delays related to detecting beam failure.

As described herein, a wireless communications system may support efficient techniques to facilitate beam failure detection at a UE 115. In particular, as more and more capabilities are introduced or become available at UEs 115 (e.g., at a UE side), UEs 115 may perform some tasks autonomously (e.g., based on machine learning). Thus, in one aspect of the techniques described herein, a UE 115 may be configured to autonomously select one or more criteria for detecting beam failure. Using this technique and others described herein, the beam failure detection reaction time at a UE 115 and the UE processing delay may be improved. That is, it may be unnecessary for the UE 115 to wait for instructions from the base station 105 to detect beam failure. As a result, the UE 115 may have a potentially faster reaction time to beam failure events. Further, such techniques may relax base station resources because less resources may be used to control the UE 115.

Figure 2:
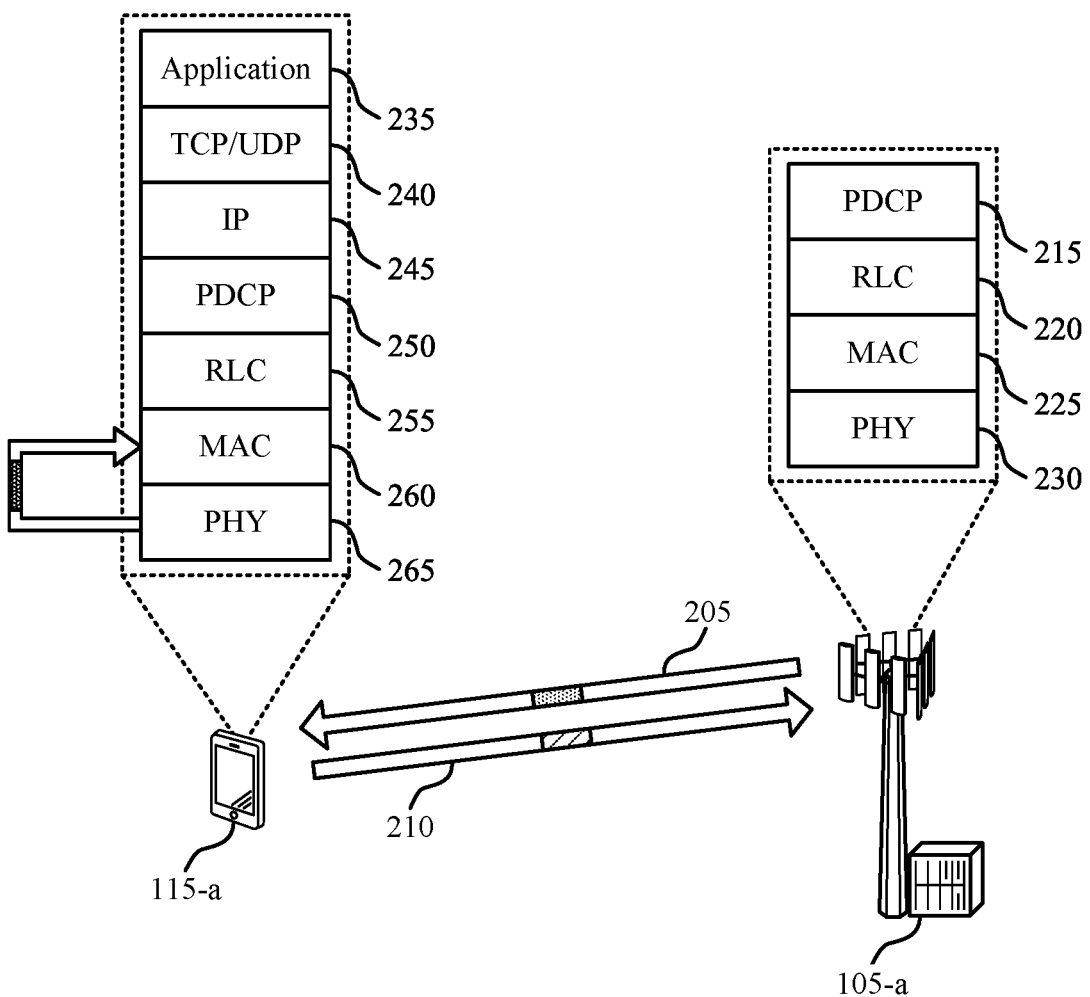
FIG. 2 illustrates an example of a wireless communications system that supports criteria selection for beam failure detection in accordance with aspects of the present disclosure.

FIG. 2 illustrates an example of a wireless communications system 200 that supports criteria selection for beam failure detection in accordance with aspects of the present disclosure. The wireless communications system 200 includes a UE 115-a, which may be an example of a UE 115 described with reference to FIG. 1. The wireless communications system 200 also includes a base station 105-a, which may be an example of a base station 105 described with reference to FIG. 1. The UE 115 may communicate with the base station 105 on resources of a carrier 205 and a carrier 210 (e.g., which may correspond to different or the same carriers). The wireless communications system 200 may implement aspects of the wireless communications system 100. For example, the wireless communications system 200 may support efficient techniques to facilitate beam failure detection at the UE 115-a.

Similar to wireless communications system 100, wireless communications system 200 may be a packet-based network that operates according to a layered protocol stack. In the user plane, the base station 105-a may include radio access network layers including a PDCP layer 215, RLC layer 220, MAC layer 225, and PHY layer 230, and UE 115-a may include an application layer 235, TCP/UDP layer 240, IP layer 245, and corresponding radio access network layers including a PDCP layer 250, RLC layer 255, MAC layer 260, and PHY layer 265. Although the examples described herein relate to techniques performed at the MAC layer 260, the PHY layer 265, or both, it is to be understood that the same techniques may be implemented at another layer at the UE 115-a.

In the example of FIG. 2, the UE 115-a may receive BFD-RSs from the base station 105-a (e.g., on the carrier 205), and the UE 115-a may perform one or more measurements on the BFD-RSs received from the base station 105-a. The UE 115-a may also select one or more criteria to use for beam failure detection (i.e., the UE 115-a may decide BFI criteria) based on the performed measurements. In an example, the UE 115-a may decide to use one or more measurements of SINR, signal-to-noise ratio (SNR), reference signal received power (RSRP), received signal strength indicator (RSSI), pathloss, interference, etc. to determine a BFI (e.g., as opposed to determining a BFI based solely on a SINR measurement). These measurements may be referred to as channel condition measurements. Further, the selected one or more criteria may refer to thresholds associated with each of the one or more measurements that the UE 115-a decides to use to determine the BFI. Alternatively, the selected one or more criteria may simply refer to the one or more measurements.

In some cases, the UE 115-a may determine the BFI at the PHY layer 265 at the UE 115-a or the MAC layer 260 at the UE 115-a using the one or more measurements. In any case, the UE 115-a may send an indication 270 used to identify beam failure from the PHY layer 265 to the MAC layer 260. If the UE 115-a determines the BFI at the PHY layer 265, the UE 115-a may send the BFI from the PHY layer 265 to the MAC layer 260. Otherwise, in some examples, the UE 115-a may send the one or more measurements performed on the BFD-RSs from the PHY layer 265 to the MAC layer 260. In such examples, the UE 115-a may determine the BFI at the MAC layer 260. The UE 115-a may then use the BFI at the MAC layer 260 to detect beam failure (e.g., increment a BFI counter at the MAC layer 260).

In some examples, the UE 115-a may determine the BFI at the PHY layer 265 or the MAC layer 260 using an algorithm (e.g., a machine learning algorithm, such as a neural network). The algorithm may take the one or more measurements performed on the BFD-RSs as input (e.g., channel condition measurements) and may generate a BFI as output. In some cases, the UE 115-a (e.g., the algorithm at the UE 115-a) may either generate a binary BFI decision (e.g., generate a BFI or avoid generating a BFI), and, in other cases, the UE 115-a (e.g., the algorithm at the UE 115-a) may generate a non-binary value for the BFI (e.g., w, where w≥0 and w is a real number). Thus, the output of the algorithm may be a binary BFI decision or a non-binary BFI value. Binary and non-binary BFIs may be referred to as different BFI properties, and the UE 115-a may therefore support multiple BFI properties.

In addition to supporting multiple BFI properties, the UE 115-a may also support multiple BFI types (e.g., as opposed to one type of BFI). As an example, the UE 115-a may support a first type of BFI associated with a signal condition of a beam used for communication with the base station 105-a and a second type of BFI associated with interference applied to the beam. The first type of BFI may indicate a strength of a channel between the UE 115-a and the base station 105-a, and the second type of BFI may indicate the interference between the UE 115-a and the base station 105-a. In some examples, the first type of BFI may be a noise BFI that shows channel strength (e.g., that the channel strength is low), and the second type of BFI may be an interference BFI that shows interference regardless of channel strength (e.g., that the channel strength is satisfactory but the interference is high). In some examples, the UE 115-a may determine noise based on pathloss, and the UE 115-a may determine interference based on a combination of pathloss and SINR (e.g., where low pathloss and low SINR indicates high interference).

In addition to determining the BFI, the UE 115-a may also determine, at the PHY layer 265 or the MAC layer 260, a type of the BFI to use to detect beam failure. If the UE 115-a determines the type of the BFI at the PHY layer 265, the UE 115-a may send the type of the BFI from the PHY layer 265 to the MAC layer 260 (e.g., with or without the binary BFI decision or the non-binary BFI value). Alternatively, if the UE 115-a determines the BFI type at the MAC layer, the UE 115-a may send the measurements performed on the BFD-RSs from the PHY layer 265 to the MAC layer 260. In any case, the UE 115-a may determine the type of the BFI based on UE autonomous criteria (e.g., the one or more criteria selected by the UE 115-a to use for beam failure detection).

Further, the UE 115-a may determine the type of the BFI at the PHY layer 265 or the MAC layer 260 using an algorithm (e.g., using machine learning based on channel condition measurements). The algorithm may take the one or more measurements performed on the BFD-RSs as input (e.g., SINR, SNR, RSRP, pathloss, interference measurements, etc.) and may generate one or more types of BFIs. In some cases, the UE 115-a (e.g., the algorithm at the UE 115-*a*) may either generate a binary BFI decision for each of the one or more types of BFIs (e.g., a binary BFI with a specific type, such as a noise BFI or an interference BFI), and, in other cases, the UE 115-*a* may generate a non-binary value for each of the one or more types of BFIs (e.g., a non-binary BFI with a specific type, such as a noise BFI with weight w1 or an interference BFI with weight w2, where w1≥0 and w2≥0 and w1 and w2 are real numbers). The UE 115-*a* may then use the BFI at the MAC layer 260 to detect beam failure (i.e., BFI types with or without real valued weights are used in the MAC layer 260 for beam failure detection related procedures).

In addition to the techniques described above, the UE 115-*a* or different UEs 115 may support different levels of autonomy for managing beam failure detection operations. Accordingly, the base station 105-*a* may signal a level of autonomy to the UE 115-*a*. That is, the base station 105-*a* may activate which level or levels of autonomy on which each UE 115 may operate (e.g., if each UE 115 or different UEs 115 may operate on multiple combinations of autonomy levels). A first level of autonomy may correspond to the UE 115-*a* autonomously selecting one or more criteria for beam failure detection, a second level of autonomy may correspond to the UE 115 autonomously determining a process for determining a BFI, etc.

In some cases, the UE 115-*a* may indicate a capability of the UE 115-*a* to the base station 105-*a*, and the base station 105-*a* may determine the level of autonomy to signal to the UE 115-*a* based on the capability of the UE 115-*a*. The capability of the UE 115-*a* (i.e., UE capability) may indicate whether the UE 115-*a* supports machine learning features, a processing power and capacity of the UE 115-*a*, an amount of memory at the UE 115-*a*, a quantity of computation resources at the UE 115-*a*, etc. In some cases, the UE 115-*a* may indicate its capability via a MAC control element (MAC-CE) or uplink control information (UCI), and the base station 105-*a* may signal the level of autonomy via a MAC-CE or downlink control information (DCI). The base station 105-*a* may also change the level of autonomy at the UE 115-*a* when appropriate (e.g., via MAC-CE or DCI).

Figure 3:
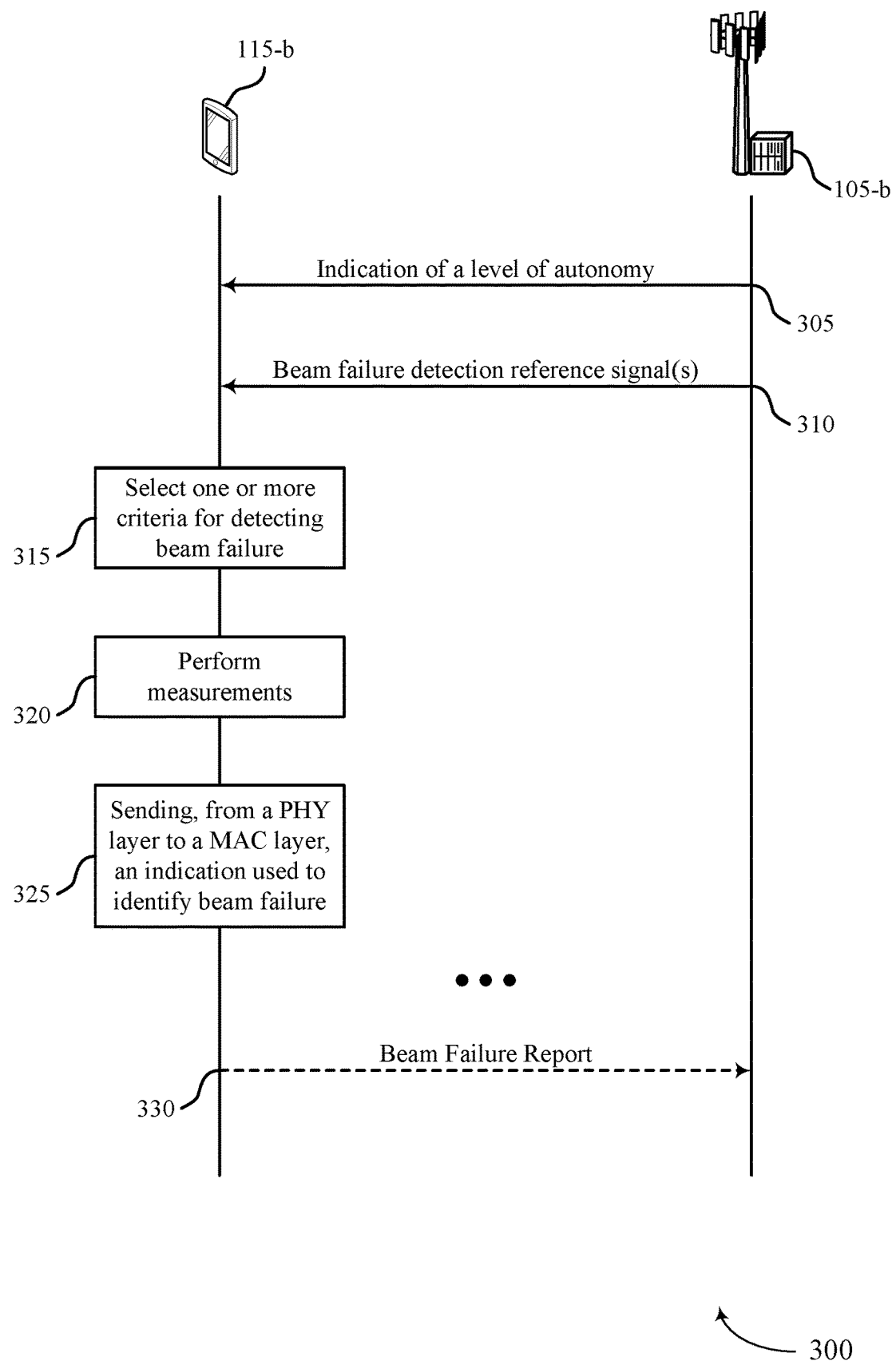
FIG. 3 illustrates an example of a process flow that supports criteria selection for beam failure detection in accordance with aspects of the present disclosure.

FIG. 3 illustrates an example of a process flow 300 that supports criteria selection for beam failure detection in accordance with aspects of the present disclosure. Process flow 300 includes a UE 115-*b*, which may be an example of a UE 115 described with reference to FIGS. 1 and 2. Process flow 300 also includes a base station 105-*b*, which may be an example of a base station 105 described with reference to FIGS. 1 and 2. The process flow 300 may implement aspects of wireless communications system 200. For example, the process flow 300 may support efficient techniques to facilitate beam failure detection at the UE 115-*b*.

In the following description of the process flow 300, the signaling exchanged between the UE 115-*b* and the base station 105-*b* may be exchanged in a different order than the example order shown, or the operations performed by the UE 115-*b* and the base station 105-*b* may be performed in different orders or at different times. Some operations may also be omitted from the process flow 300, and other operations may be added to the process flow 300.

At 305, the UE 115-*b* may receive, from the base station 105-*b*, an indication of a level of autonomy with which the UE 115-*b* is to manage beam failure detection operations. The UE 115-*b* may receive the indication of the level of autonomy via DCI or a MAC-CE. In some cases, the UE 115-*b* may transmit, to the base station 105-*b*, an indication of a capability of the UE 115-*b* for applying the one or more criteria to the measurements to detect beam failure. In such cases, the UE 115-*b* may receive the indication of the level of autonomy based on transmitting the capability of the UE 115-*b*.

At 310, the UE 115-*b* may receive one or more BFD-RSs from the base station 105-*b*. At 315, the UE 115-*b* may select one or more criteria for detecting beam failure of a beam associated with the UE 115-*b*. For instance, the UE 115-*b* may select one or more thresholds associated with a SINR, one or more thresholds associated with a SNR, one or more thresholds associated with an RSRP, one or more thresholds associated with an RSSI, one or more thresholds associated with a pathloss parameter, or one or more thresholds associated with an interference parameter for detecting beam failure, or any combination of thresholds thereof for any combinations of parameters thereof.

At 320, the UE 115-*b* may perform measurements on the one or more BFD-RSs received from the base station 105-*d* and associated with the beam based on the selected one or more criteria. At 325, the UE 115-*b* may send, from a PHY layer at the UE 115-*b* to a MAC layer at the UE 115-*b*, an indication used to identify beam failure based on measurements performed on the one or more BFD-RSs.

In one aspect, the UE 115-*b* may send, from the PHY layer to the MAC layer, a BFI based on the measurements performed on the one or more BFD-RSs satisfying the one or more criteria. In this aspect, the UE 115-*b* may determine, at the PHY layer, the BFI for the beam based on the measurements performed on the one or more BFD-RSs satisfying the one or more criteria. In another aspect, the UE 115-*b* may send, from the PHY layer to the MAC layer, the measurements performed on the one or more BFD-RSs. In this aspect, the UE 115-*b* may determine, at the MAC layer, a BFI for the beam based on the measurements received from the PHY layer.

Regardless of whether the UE 115-*b* determines the BFI at the PHY layer or the MAC layer, the UE 115-*b* may determine the BFI using an algorithm (e.g., machine learning algorithm) taking the measurements performed on the one or more BFD-RSs as inputs and generating the BFI as output. In some examples, rather than comparing measurements to criteria, the algorithm may simply output a binary decision for a BFI (e.g., whether or not to increment a BFI counter at the MAC layer) or a non-binary BFI value based on inexplicit operations.

In some cases, the UE 115-*b* may determine whether the measurements satisfy the one or more criteria, and the BFI may be a binary value indicating whether the measurements satisfy the one or more criteria. The binary value of the BFI may represent whether or not a BFI is generated. For instance, if the measurements satisfy the one or more criteria or if the algorithm indicates no beam failure, the UE 115-*b* may avoid generating a BFI. Otherwise, the UE 115-*b* may generate a BFI (e.g., used to increment a counter at the MAC layer). In other cases, the UE 115-*b* may determine a value for each measurement of the measurements compared with the one or more criteria, and the UE 115-*b* may determine a non-binary value based on the value for each measurement of the measurements compared with the one or more criteria. In such cases, the BFI may be the non-binary value.

In some cases, the UE 115-*b* may also identify a type of the BFI based on the selected one or more criteria. In such cases, the UE 115-*b* may send the type of the BFI from the PHY layer at the UE 115-*b* to the MAC layer at the UE 115-*b*. Alternatively, the UE 115-*b* may identify the type of the BFI at the MAC layer at the UE 115-*b*. The UE 115-*b* may identify the type of the BFI using a machine learning algorithm taking the measurements performed on the one or more BFD-RSs as inputs and generating the type of the BFI as output.

The type of the BFI may be a first type of BFI associated with a signal condition of the beam or a second type of BFI associated with interference applied to the beam. The first type of BFI may indicate a strength of a channel between the UE 115-b and the base station 105-b. The second type of BFI may indicate interference between the UE 115-b and the base station 105-b.

The UE 115-b may continuously monitor the quality of a beam based on the BFIs determined using the techniques described herein, and the MAC layer at the UE 115-b may keep a counter of BFIs. If the counter exceeds a threshold, at 330, the MAC layer at the UE 115-b may trigger the UE 115-b to transmit a beam failure report to the base station 105-b. The UE 115-b may then coordinate with the base station 105-b to switch the beam used for communications to allow for a high quality of communications between the UE 115-b and the base station 105-b.

Figure 4:
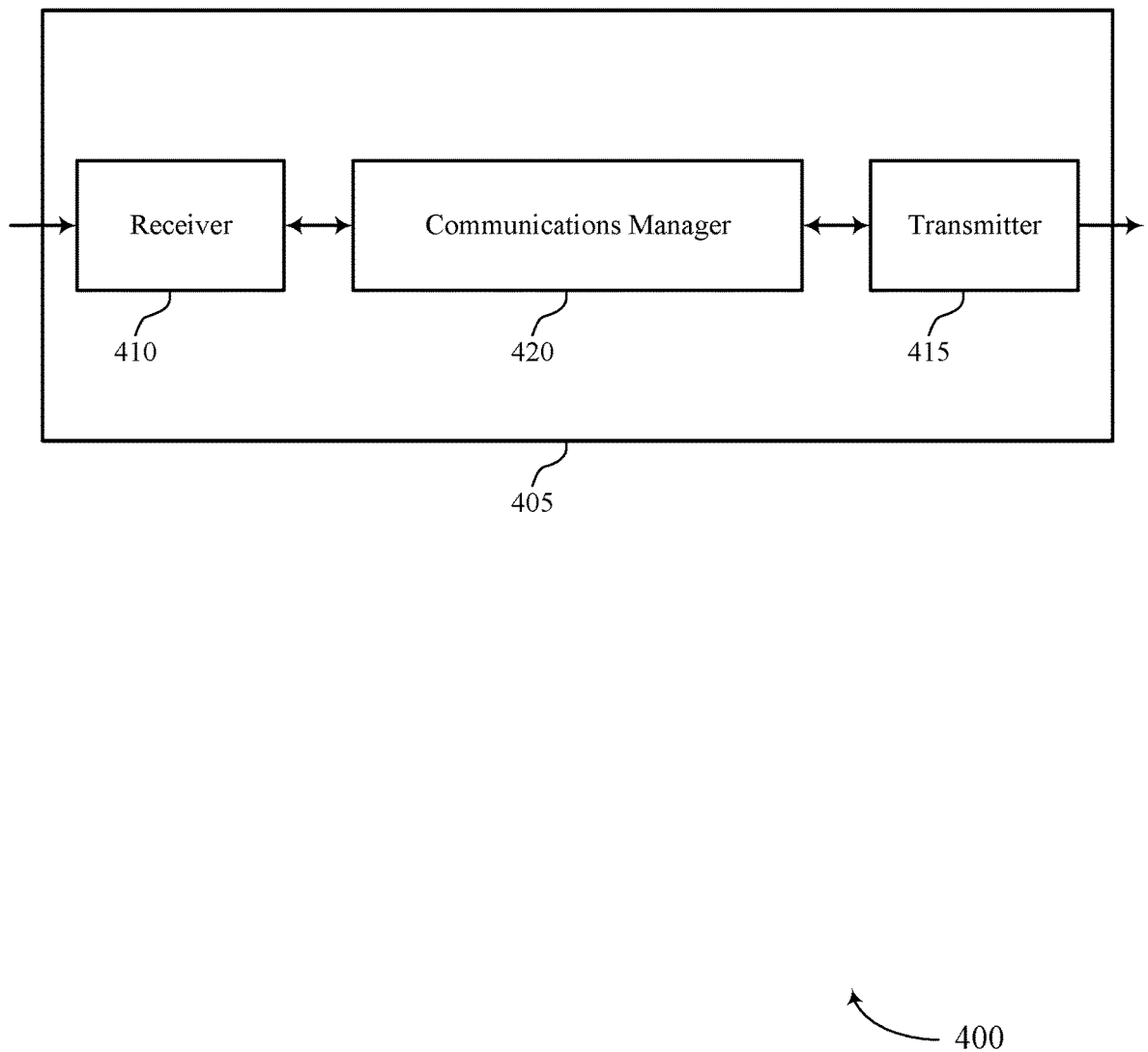
FIGS. 4 and 5 show block diagrams of devices that support criteria selection for beam failure detection in accordance with aspects of the present disclosure.

FIG. 4 shows a block diagram 400 of a device 405 that supports criteria selection for beam failure detection in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to criteria selection for beam failure detection). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to criteria selection for beam failure detection). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of criteria selection for beam failure detection as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for selecting, by the UE, one or more criteria for detecting beam failure of a beam associated with the UE. The communications manager 420 may be configured as or otherwise support a means for performing measurements on one or more beam failure detection reference signals received from a base station and associated with the beam based on the selected one or more criteria. The communications manager 420 may be configured as or otherwise support a means for sending, from a physical layer at the UE to a medium access control layer at the UE, an indication used to identify beam failure based on the measurements performed on the one or more beam failure detection reference signals.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced processing and more efficient utilization of communication resources. In particular, a UE may be able to efficiently detect beam failure with less control signaling from a base station. Because the control signaling may be reduced, the control overhead between the UE and the base station may be reduced, and processing delays associated with beam failure detection at the UE may also be reduced.

Figure 5:
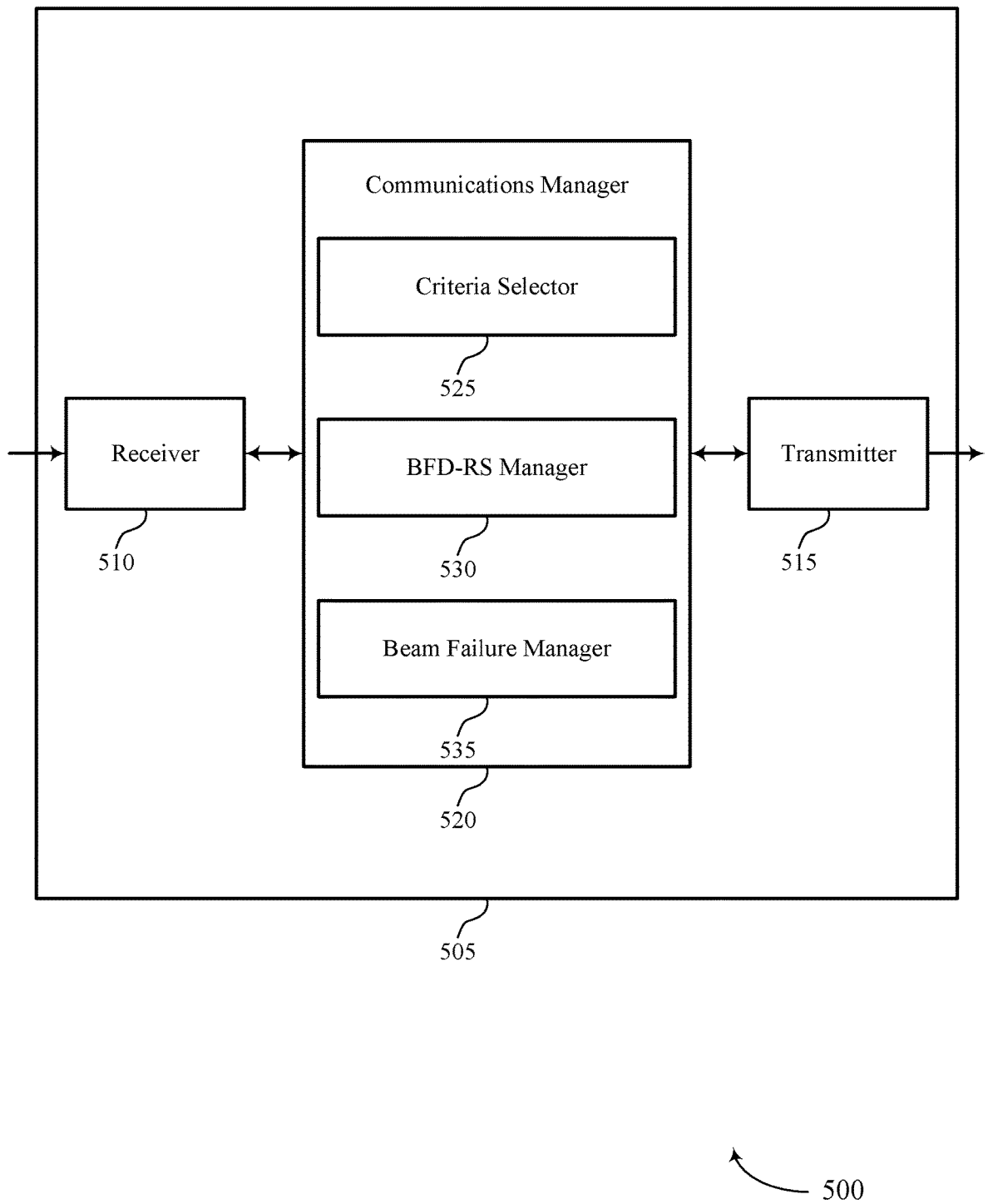

FIG. 5 shows a block diagram 500 of a device 505 that supports criteria selection for beam failure detection in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to criteria selection for beam failure detection). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to criteria selection for beam failure detection). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of criteria selection for beam failure detection as described herein. For example, the communications manager 520 may include a criteria selector 525, an BFD-RS manager 530, a beam failure manager 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The criteria selector 525 may be configured as or otherwise support a means for selecting, by the UE, one or more criteria for detecting beam failure of a beam associated with the UE. The BFD-RS manager 530 may be configured as or otherwise support a means for performing measurements on one or more beam failure detection reference signals received from a base station and associated with the beam based on the selected one or more criteria. The beam failure manager 535 may be configured as or otherwise support a means for sending, from a physical layer at the UE to a medium access control layer at the UE, an indication used to identify beam failure based on the measurements performed on the one or more beam failure detection reference signals.

Figure 6:
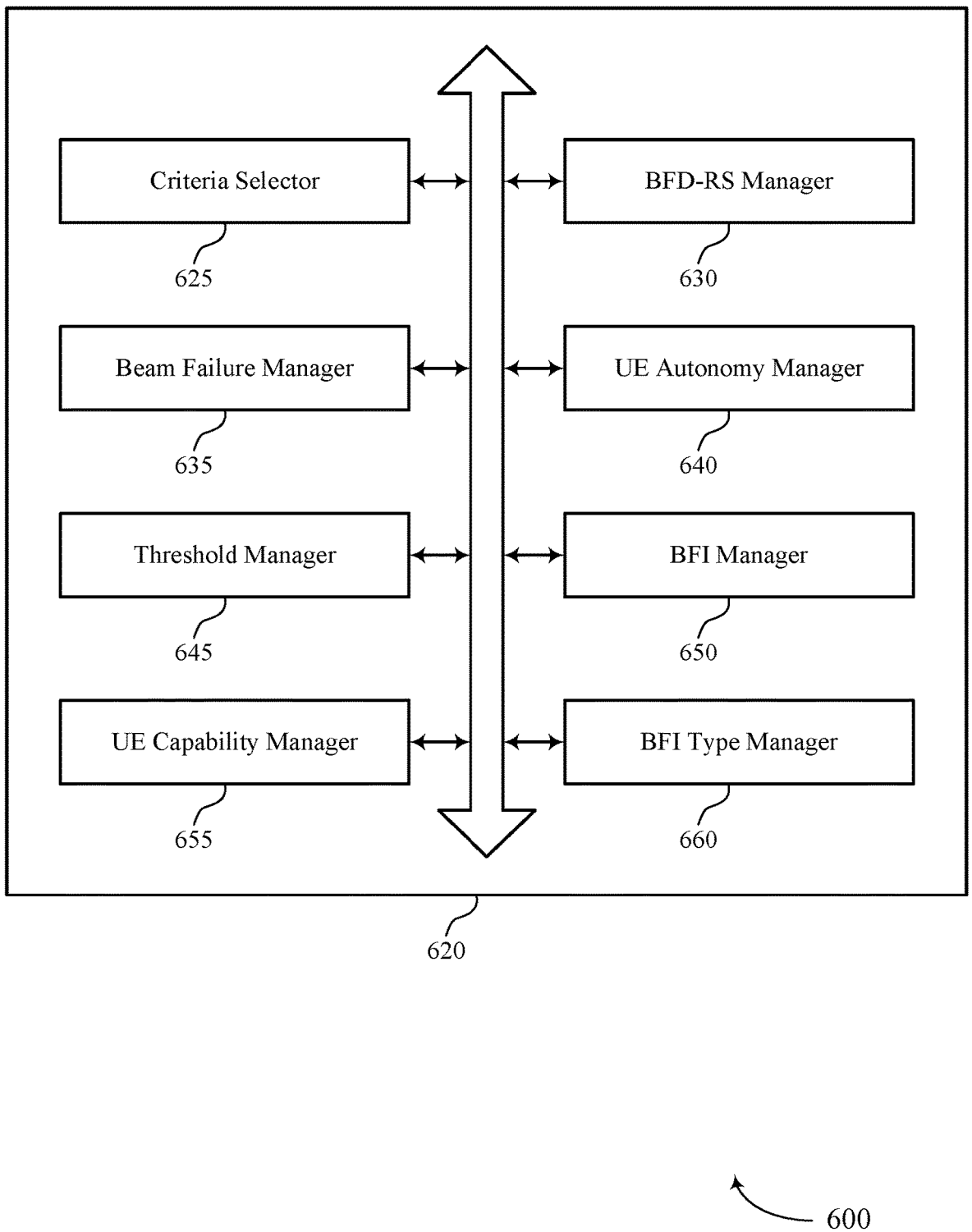
FIG. 6 shows a block diagram of a communications manager that supports criteria selection for beam failure detection in accordance with aspects of the present disclosure.

FIG. 6 shows a block diagram 600 of a communications manager 620 that supports criteria selection for beam failure detection in accordance with aspects of the present disclosure. The communications manager 620 may be an example of aspects of a communications manager 420, a communications manager 520, or both, as described herein. The communications manager 620, or various components thereof, may be an example of means for performing various aspects of criteria selection for beam failure detection as described herein. For example, the communications manager 620 may include a criteria selector 625, an BFD-RS manager 630, a beam failure manager 635, a UE autonomy manager 640, a threshold manager 645, a BFI manager 650, a UE capability manager 655, a BFI type manager 660, or any combination thereof. Each of these components may communicate, directly or indirectly, with one another (e.g., via one or more buses).

The communications manager 620 may support wireless communication at a UE in accordance with examples as disclosed herein. The criteria selector 625 may be configured as or otherwise support a means for selecting, by the UE, one or more criteria for detecting beam failure of a beam associated with the UE. The BFD-RS manager 630 may be configured as or otherwise support a means for performing measurements on one or more beam failure detection reference signals received from a base station and associated with the beam based on the selected one or more criteria. The beam failure manager 635 may be configured as or otherwise support a means for sending, from a physical layer at the UE to a medium access control layer at the UE, an indication used to identify beam failure based on the measurements performed on the one or more beam failure detection reference signals.

In some examples, the UE autonomy manager 640 may be configured as or otherwise support a means for receiving, from the base station, an indication of a level of autonomy with which the UE is to manage beam failure detection operations.

In some examples, to support receiving the indication of the level of autonomy, the UE autonomy manager 640 may be configured as or otherwise support a means for receiving the indication of the level of autonomy via downlink control information or a medium access control element.

In some examples, the UE capability manager 655 may be configured as or otherwise support a means for transmitting, to the base station, an indication of a capability of the UE for applying the one or more criteria to the measurements to detect beam failure, where receiving the indication of the level of autonomy is based on the capability of the UE.

In some examples, to support selecting the one or more criteria for detecting beam failure, the threshold manager 645 may be configured as or otherwise support a means for selecting one or more thresholds associated with a signal-to-interference-plus-noise ratio, one or more thresholds associated with a signal-to-noise ratio, one or more thresholds associated with a reference signal received power parameter, one or more thresholds associated with a received signal strength indicator, one or more thresholds associated with a pathloss parameter, or one or more thresholds associated with an interference parameter for detecting beam failure, or any combination of thresholds thereof for any combination of parameters thereof.

In some examples, to support sending the indication used to identify beam failure, the BFI manager 650 may be configured as or otherwise support a means for sending, from the physical layer to the medium access control layer, a beam failure indicator based on the measurements performed on the one or more beam failure detection reference signals satisfying the one or more criteria.

In some examples, the BFI manager 650 may be configured as or otherwise support a means for determining, at the physical layer, the beam failure indicator for the beam based on the measurements performed on the one or more beam failure detection reference signals satisfying the one or more criteria, where sending the beam failure indicator is based on the determining.

In some examples, to support determining the beam failure indicator, the BFI manager 650 may be configured as or otherwise support a means for determining the beam failure indicator using a machine learning algorithm taking the measurements performed on the one or more beam failure detection reference signals as inputs and generating the beam failure indicator as an output.

In some examples, to support determining the beam failure indicator, the BFI manager 650 may be configured as or otherwise support a means for determining whether the measurements satisfy the one or more criteria, the beam failure indicator including a binary value indicating whether the measurements satisfy the one or more criteria.

In some examples, to support determining the beam failure indicator, the BFI manager 650 may be configured as or otherwise support a means for determining a value for each measurement of the measurements compared with the one or more criteria. In some examples, to support determining the beam failure indicator, the BFI manager 650 may be configured as or otherwise support a means for determining a non-binary value based on the value for each measurement of the measurements compared with the one or more criteria, the beam failure indicator including the non-binary value.

In some examples, the BFI type manager 660 may be configured as or otherwise support a means for identifying, at the physical layer, a type of the beam failure indicator based on the selected one or more criteria, where sending the indication includes sending the type of the beam failure indicator.

In some examples, to support identifying the type of the beam failure indicator, the BFI type manager 660 may be configured as or otherwise support a means for identifying the type of the beam failure indicator using a machine learning algorithm taking the measurements performed on the one or more beam failure detection reference signals as inputs and generating the type of the beam failure indicator as an output.

In some examples, the type of the beam failure indicator includes a first type of beam failure indicator associated with a signal condition of the beam or a second type of beam failure indicator associated with interference applied to the beam.

In some examples, the first type of beam failure indicator indicates a strength of a channel between the UE and the base station. In some examples, the second type of beam failure indicator indicates interference between the UE and the base station.

In some examples, to support sending the indication, the beam failure manager 635 may be configured as or otherwise support a means for sending, from the physical layer to the medium access control layer, the measurements performed on the one or more beam failure detection reference signals.

In some examples, the BFI manager 650 may be configured as or otherwise support a means for determining, at the medium access control layer, a beam failure indicator for the beam based on the measurements received from the physical layer.

In some examples, to support determining the beam failure indicator, the BFI manager 650 may be configured as or otherwise support a means for determining the beam failure indicator using a machine learning algorithm taking the measurements received from the physical layer as inputs and generating the beam failure indicator as an output.

In some examples, to support determining the beam failure indicator, the BFI manager 650 may be configured as or otherwise support a means for determining whether the measurements satisfy the one or more criteria, the beam failure indicator including a binary value indicating whether the measurements satisfy the one or more criteria.

In some examples, to support determining the beam failure indicator, the BFI manager 650 may be configured as or otherwise support a means for determining a value for each measurement of the measurements compared with the one or more criteria. In some examples, to support determining the beam failure indicator, the BFI manager 650 may be configured as or otherwise support a means for determining a non-binary value based on the value for each measurement of the measurements compared with the one or more criteria, the beam failure indicator including the non-binary value.

In some examples, the BFI type manager 660 may be configured as or otherwise support a means for identifying, at the medium access control layer, a type of the beam failure indicator based on the selected one or more criteria.

In some examples, to support identifying the type of the beam failure indicator, the BFI type manager 660 may be configured as or otherwise support a means for identifying the type of the beam failure indicator using a machine learning algorithm taking the measurements received from the physical layer as input and generating the type of the beam failure indicator as an output.

In some examples, the type of the beam failure indicator includes a first type of beam failure indicator associated with a signal condition of the beam or a second type of beam failure indicator associated with interference applied to the beam.

In some examples, the first type of beam failure indicator indicates a strength of a channel between the UE and the base station. In some examples, the second type of beam failure indicator indicates interference between the UE and the base station.

Figure 7:
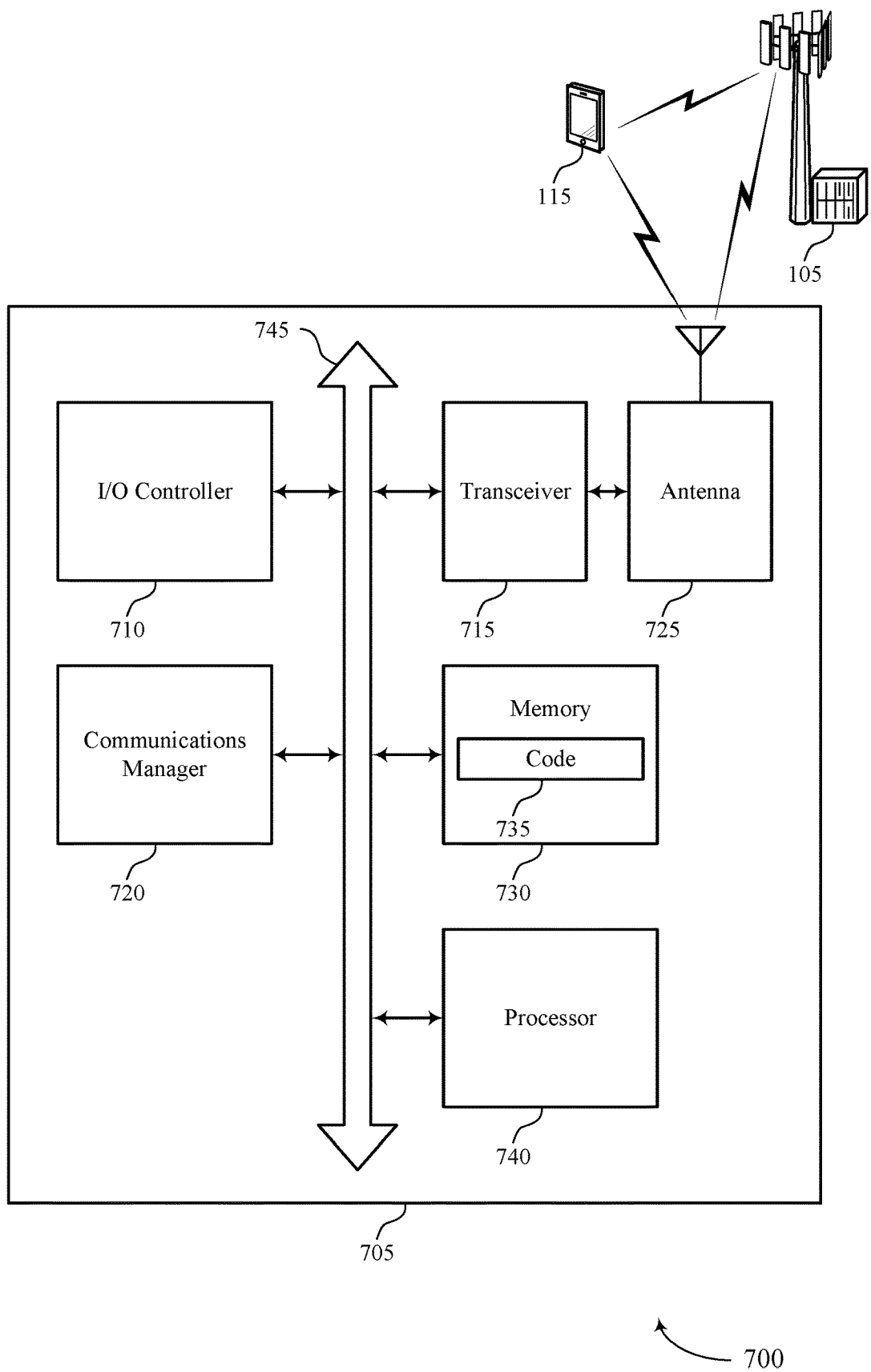
FIG. 7 shows a diagram of a system including a device that supports criteria selection for beam failure detection in accordance with aspects of the present disclosure.

FIG. 7 shows a diagram of a system 700 including a device 705 that supports criteria selection for beam failure detection in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting criteria selection for beam failure detection). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for selecting, by the UE, one or more criteria for detecting beam failure of a beam associated with the UE. The communications manager 720 may be configured as or otherwise support a means for performing measurements on one or more beam failure detection reference signals received from a base station and associated with the beam based on the selected one or more criteria. The communications manager 720 may be configured as or otherwise support a means for sending, from a physical layer at the UE to a medium access control layer at the UE, an indication used to identify beam failure based on the measurements performed on the one or more beam failure detection reference signals.

By including or configuring the communications manager 720 in accordance with examples as described herein, the device 705 may support techniques for reduced processing and more efficient utilization of communication resources.

In particular, a UE may be able to efficiently detect beam failure with less control signaling from a base station. Because the control signaling may be reduced, the control overhead between the UE and the base station may be reduced, and processing delays associated with beam failure detection at the UE may also be reduced.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of criteria selection for beam failure detection as described herein, or the processor 740 and the memory 730 may be otherwise configured to perform or support such operations.

Figure 8:
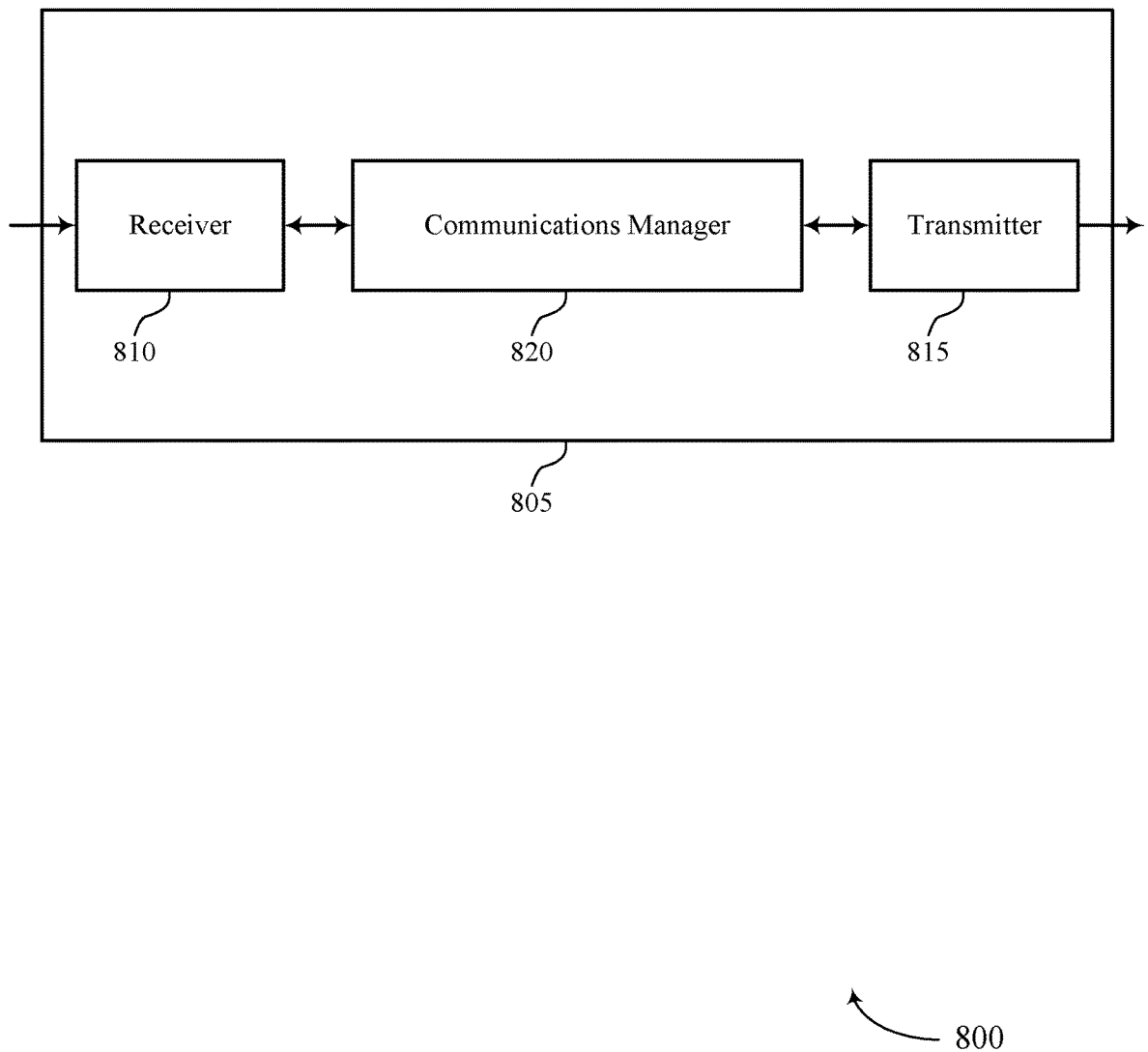
FIGS. 8 and 9 show block diagrams of devices that support criteria selection for beam failure detection in accordance with aspects of the present disclosure.

FIG. 8 shows a block diagram 800 of a device 805 that supports criteria selection for beam failure detection in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to criteria selection for beam failure detection). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to criteria selection for beam failure detection). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of criteria selection for beam failure detection as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure.

In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for transmitting, to a UE, an indication of a level of autonomy with which the UE is to manage beam failure detection operations. The communications manager 820 may be configured as or otherwise support a means for transmitting, to the UE, one or more beam failure detection reference signals associated with a beam used for communications with the UE. The communications manager 820 may be configured as or otherwise support a means for receiving, from the UE, a beam failure report based on transmitting the indication of the level of autonomy and the one or more beam failure detection reference signals.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing and more efficient utilization of communication resources. In particular, a UE may be able to efficiently detect beam failure with less control signaling from a base station. Because the control signaling may be reduced, the control overhead between the UE and the base station may be reduced, and processing delays associated with beam failure detection at the UE may also be reduced.

Figure 9:
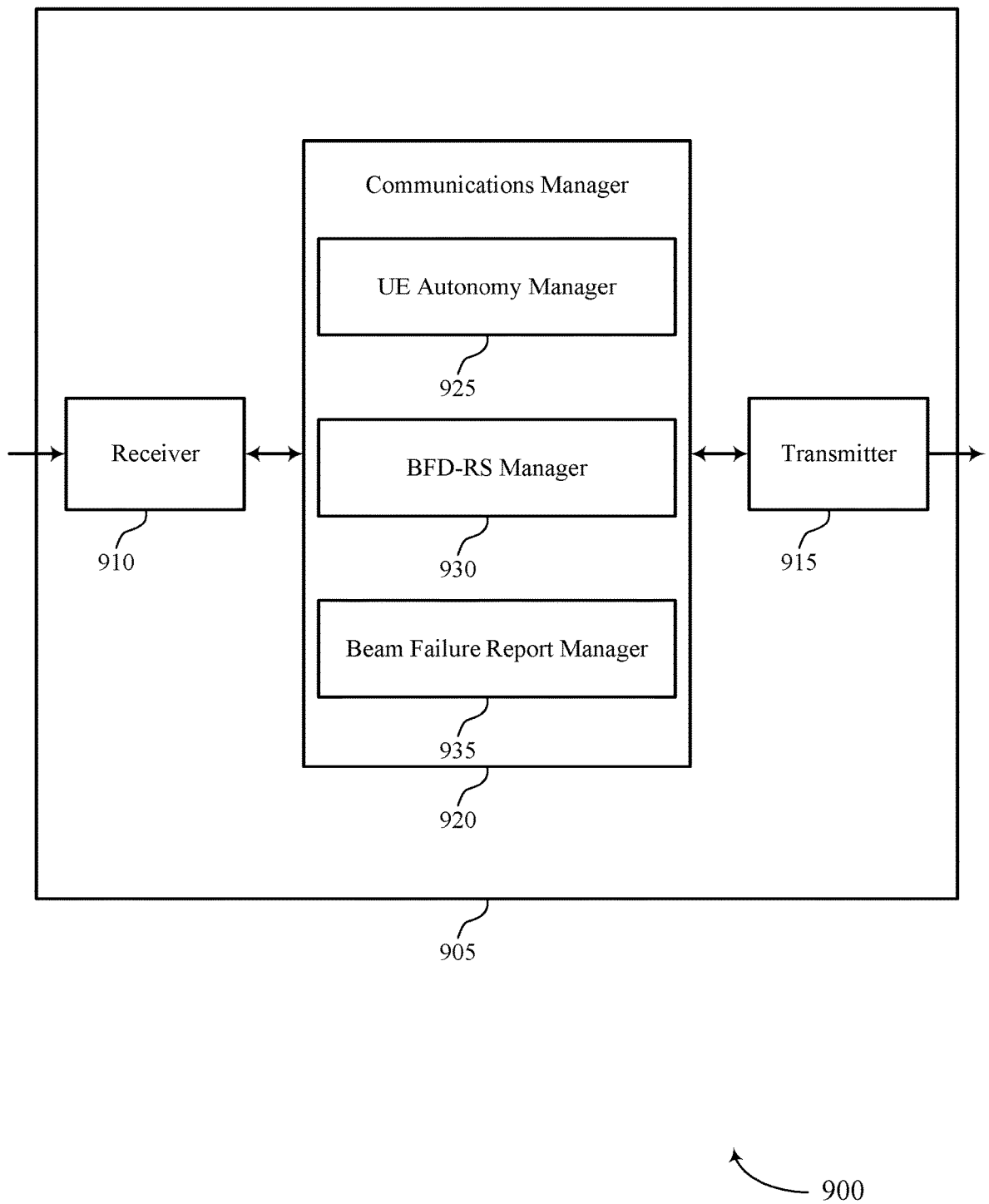

FIG. 9 shows a block diagram 900 of a device 905 that supports criteria selection for beam failure detection in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to criteria selection for beam failure detection). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to criteria selection for beam failure detection). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of criteria selection for beam failure detection as described herein. For example, the communications manager 920 may include a UE autonomy manager 925, an BFD-RS manager 930, a beam failure report manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The UE autonomy manager 925 may be configured as or otherwise support a means for transmitting, to a UE, an indication of a level of autonomy with which the UE is to manage beam failure detection operations. The BFD-RS manager 930 may be configured as or otherwise support a means for transmitting, to the UE, one or more beam failure detection reference signals associated with a beam used for communications with the UE. The beam failure report manager 935 may be configured as or otherwise support a means for receiving, from the UE, a beam failure report based on transmitting the indication of the level of autonomy and the one or more beam failure detection reference signals.

Figure 10:
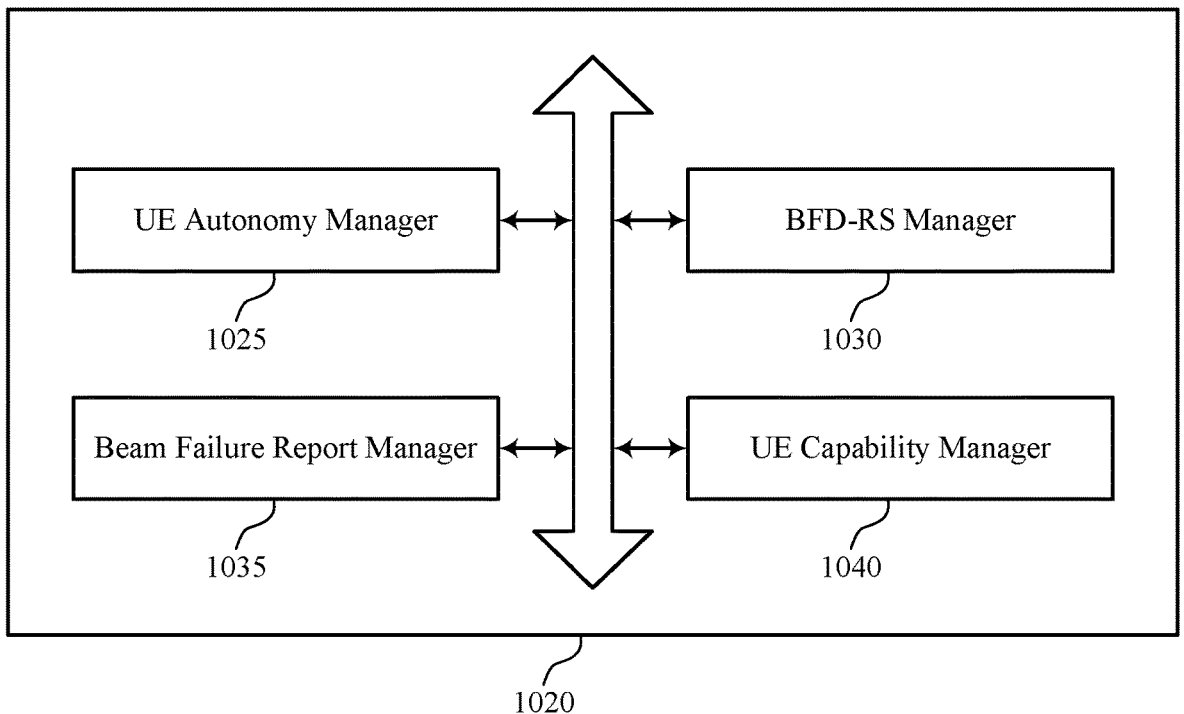
FIG. 10 shows a block diagram of a communications manager that supports criteria selection for beam failure detection in accordance with aspects of the present disclosure.

FIG. 10 shows a block diagram 1000 of a communications manager 1020 that supports criteria selection for beam failure detection in accordance with aspects of the present disclosure. The communications manager 1020 may be an example of aspects of a communications manager 820, a communications manager 920, or both, as described herein. The communications manager 1020, or various components thereof, may be an example of means for performing various aspects of criteria selection for beam failure detection as described herein. For example, the communications manager 1020 may include a UE autonomy manager 1025, an BFD-RS manager 1030, a beam failure report manager 1035, a UE capability manager 1040, or any combination thereof. Each of these components may communicate, directly or indirectly, with one another (e.g., via one or more buses).

The communications manager 1020 may support wireless communication at a base station in accordance with examples as disclosed herein. The UE autonomy manager 1025 may be configured as or otherwise support a means for transmitting, to a UE, an indication of a level of autonomy with which the UE is to manage beam failure detection operations. The BFD-RS manager 1030 may be configured as or otherwise support a means for transmitting, to the UE, one or more beam failure detection reference signals associated with a beam used for communications with the UE. The beam failure report manager 1035 may be configured as or otherwise support a means for receiving, from the UE, a beam failure report based on transmitting the indication of the level of autonomy and the one or more beam failure detection reference signals.

In some examples, the UE capability manager 1040 may be configured as or otherwise support a means for receiving, from the UE, an indication of a capability of the UE for applying one or more criteria to detect beam failure, where transmitting the indication of the level of autonomy is based on the capability of the UE.

In some examples, to support transmitting the indication of the level of autonomy, the UE autonomy manager 1025 may be configured as or otherwise support a means for transmitting the indication of the level of autonomy via downlink control information or a medium access control element.

Figure 11:
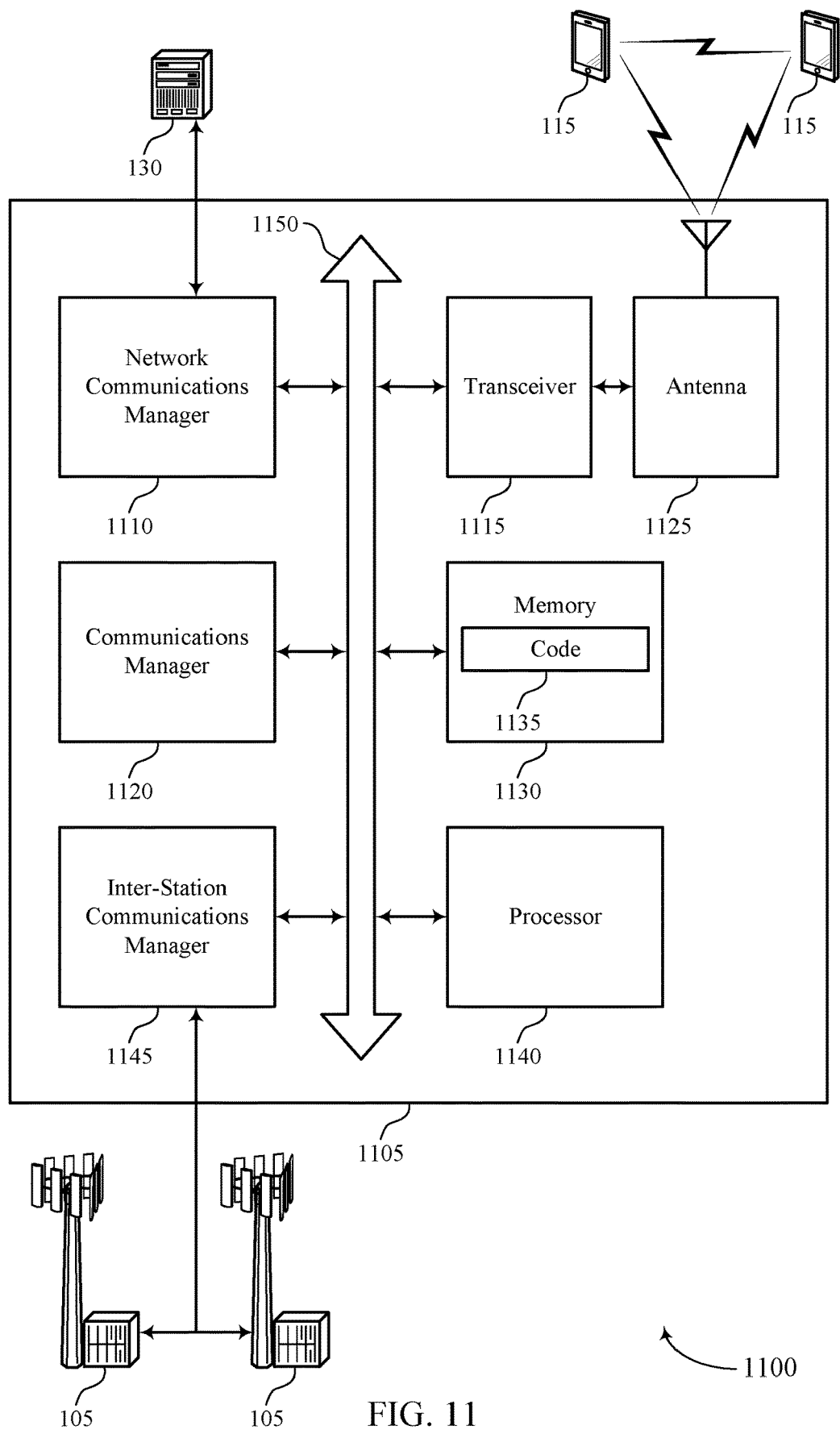
FIG. 11 shows a diagram of a system including a device that supports criteria selection for beam failure detection in accordance with aspects of the present disclosure.

FIG. 11 shows a diagram of a system 1100 including a device 1105 that supports criteria selection for beam failure detection in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting criteria selection for beam failure detection). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for transmitting, to a UE, an indication of a level of autonomy with which the UE is to manage beam failure detection operations. The communications manager 1120 may be configured as or otherwise support a means for transmitting, to the UE, one or more beam failure detection reference signals associated with a beam used for communications with the UE. The communications manager 1120 may be configured as or otherwise support a means for receiving, from the UE, a beam failure report based on transmitting the indication of the level of autonomy and the one or more beam failure detection reference signals.

By including or configuring the communications manager 1120 in accordance with examples as described herein, the device 1105 may support techniques for reduced processing and more efficient utilization of communication resources. In particular, a UE may be able to efficiently detect beam failure with less control signaling from a base station.

Because the control signaling may be reduced, the control overhead between the UE and the base station may be reduced, and processing delays associated with beam failure detection at the UE may also be reduced.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of criteria selection for beam failure detection as described herein, or the processor 1140 and the memory 1130 may be otherwise configured to perform or support such operations.

Figure 12:
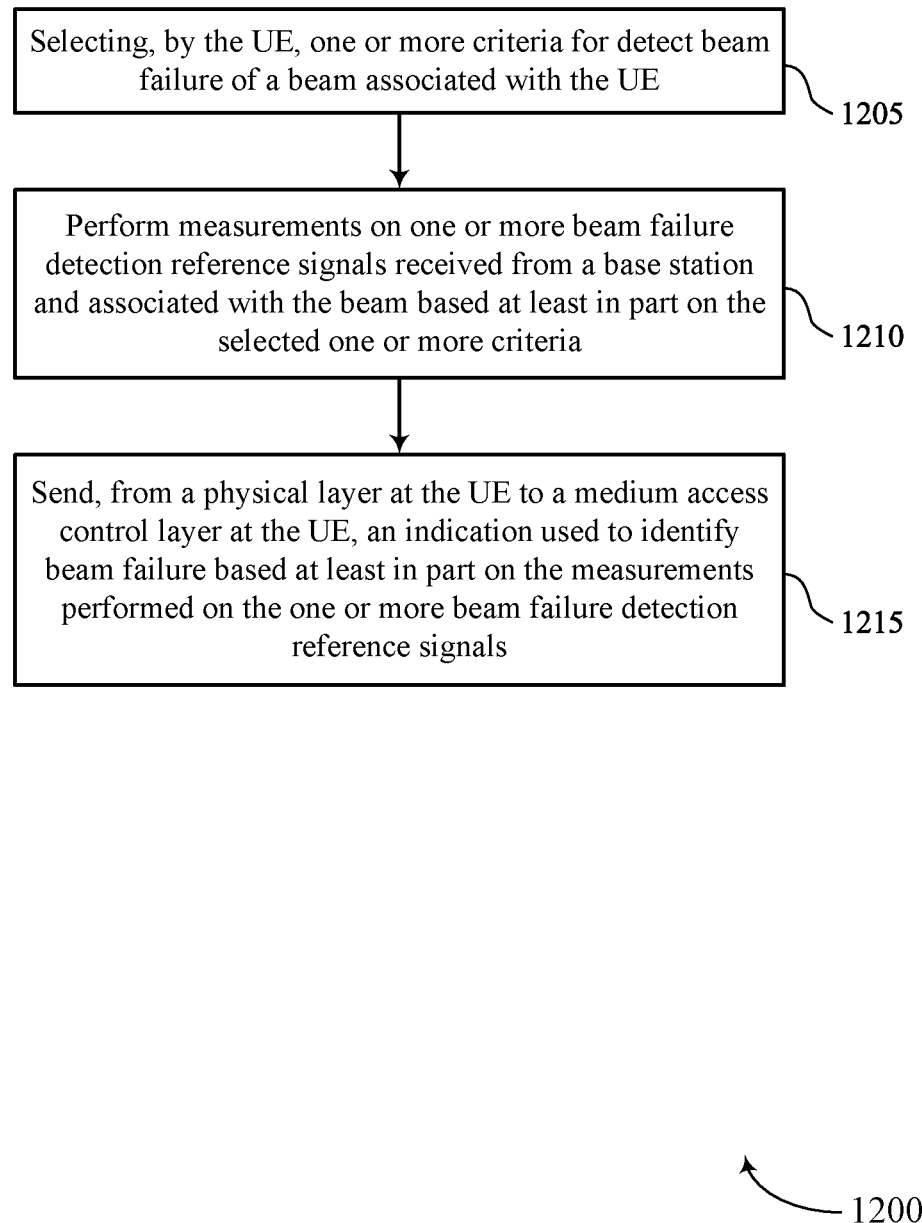
FIGS. 12 and 13 show flowcharts illustrating methods that support criteria selection for beam failure detection in accordance with aspects of the present disclosure.

FIG. 12 shows a flowchart illustrating a method 1200 that supports criteria selection for beam failure detection in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include selecting, by the UE, one or more criteria for detecting beam failure of a beam associated with the UE. The operations of 1205 may be performed in accordance with examples as disclosed herein. In some examples, aspects of the operations of 1205 may be performed by a criteria selector 625 as described with reference to FIG. 6.

At 1210, the method may include performing measurements on one or more beam failure detection reference signals received from a base station and associated with the beam based on the selected one or more criteria. The operations of 1210 may be performed in accordance with examples as disclosed herein. In some examples, aspects of the operations of 1210 may be performed by an BFD-RS manager 630 as described with reference to FIG. 6.

At 1215, the method may include sending, from a physical layer at the UE to a medium access control layer at the UE, an indication used to identify beam failure based on the measurements performed on the one or more beam failure detection reference signals. The operations of 1215 may be performed in accordance with examples as disclosed herein. In some examples, aspects of the operations of 1215 may be performed by a beam failure manager 635 as described with reference to FIG. 6.

Figure 13:
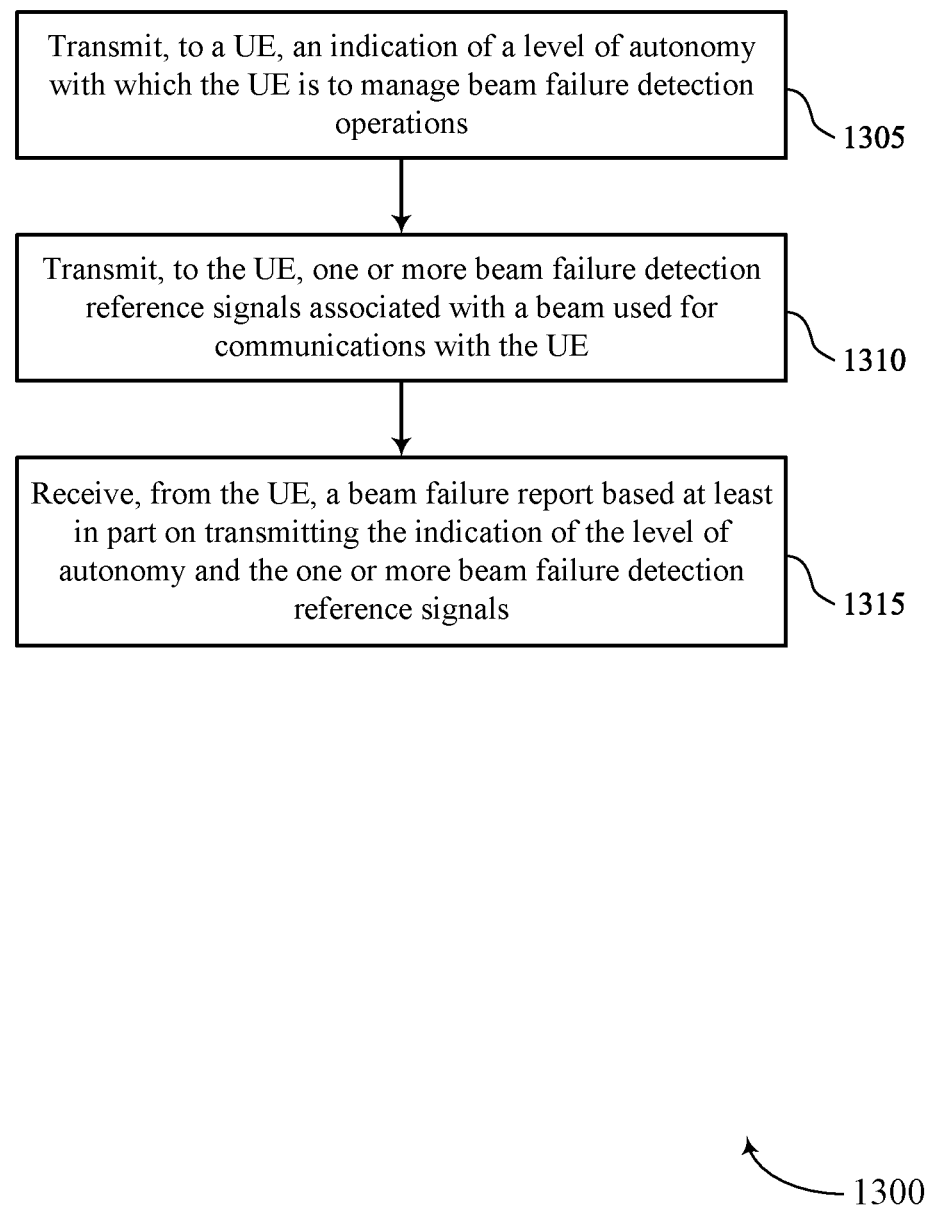

FIG. 13 shows a flowchart illustrating a method 1300 that supports criteria selection for beam failure detection in accordance with aspects of the present disclosure. The operations of the method 1300 may be implemented by a base station or its components as described herein. For example, the operations of the method 1300 may be performed by a base station 105 as described with reference to FIGS. 1 through 3 and 8 through 11. In some examples, a base station may execute a set of instructions to control the functional elements of the base station to perform the described functions. Additionally, or alternatively, the base station may perform aspects of the described functions using special-purpose hardware.

At 1305, the method may include transmitting, to a UE, an indication of a level of autonomy with which the UE is to manage beam failure detection operations. The operations of 1305 may be performed in accordance with examples as disclosed herein. In some examples, aspects of the operations of 1305 may be performed by a UE autonomy manager 1025 as described with reference to FIG. 10.

At 1310, the method may include transmitting, to the UE, one or more beam failure detection reference signals associated with a beam used for communications with the UE. The operations of 1310 may be performed in accordance with examples as disclosed herein. In some examples, aspects of the operations of 1310 may be performed by an BFD-RS manager 1030 as described with reference to FIG. 10.

At 1315, the method may include receiving, from the UE, a beam failure report based on transmitting the indication of the level of autonomy and the one or more beam failure detection reference signals. The operations of 1315 may be performed in accordance with examples as disclosed herein. In some examples, aspects of the operations of 1315 may be performed by a beam failure report manager 1035 as described with reference to FIG. 10.

The following provides an overview of aspects of the present disclosure:

Aspect 1: A method for wireless communication at a UE, comprising: selecting, by the UE, one or more criteria for detecting beam failure of a beam associated with the UE; performing measurements on one or more beam failure detection reference signals received from a base station and associated with the beam based at least in part on the selected one or more criteria; and sending, from a physical layer at the UE to a medium access control layer at the UE, an indication used to identify beam failure based at least in part on the measurements performed on the one or more beam failure detection reference signals.

Aspect 2: The method of aspect 1, further comprising: receiving, from the base station, an indication of a level of autonomy with which the UE is to manage beam failure detection operations.

Aspect 3: The method of aspect 2, wherein receiving the indication of the level of autonomy comprises: receiving the indication of the level of autonomy via downlink control information or a medium access control element.

Aspect 4: The method of any of aspects 2 through 3, further comprising: transmitting, to the base station, an indication of a capability of the UE for applying the one or more criteria to the measurements to detect beam failure, wherein receiving the indication of the level of autonomy is based at least in part on the capability of the UE.

Aspect 5: The method of any of aspects 1 through 4, wherein selecting the one or more criteria for detecting beam failure comprises: selecting one or more thresholds associated with a signal-to-interference-plus-noise ratio, one or more thresholds associated with a signal-to-noise ratio, one or more thresholds associated with a reference signal received power parameter, one or more thresholds associated with a received signal strength indicator, one or more thresholds associated with a pathloss parameter, or one or more thresholds associated with an interference parameter for detecting beam failure, or any combination of thresholds thereof for any combination of parameters thereof.

Aspect 6: The method of any of aspects 1 through 5, wherein sending the indication used to identify beam failure comprises: sending, from the physical layer to the medium access control layer, a beam failure indicator based at least in part on the measurements performed on the one or more beam failure detection reference signals satisfying the one or more criteria.

Aspect 7: The method of aspect 6, further comprising: determining, at the physical layer, the beam failure indicator for the beam based at least in part on the measurements performed on the one or more beam failure detection reference signals satisfying the one or more criteria, wherein sending the beam failure indicator is based at least in part on the determining.

Aspect 8: The method of aspect 7, wherein determining the beam failure indicator comprises: determining the beam failure indicator using a machine learning algorithm taking the measurements performed on the one or more beam failure detection reference signals as inputs and generating the beam failure indicator as an output.

Aspect 9: The method of any of aspects 7 through 8, wherein determining the beam failure indicator comprises: determining whether the measurements satisfy the one or more criteria, the beam failure indicator comprising a binary value indicating whether the measurements satisfy the one or more criteria.

Aspect 10: The method of any of aspects 7 through 9, wherein determining the beam failure indicator comprises: determining a value for each measurement of the measurements compared with the one or more criteria; and determining a non-binary value based at least in part on the value for each measurement of the measurements compared with the one or more criteria, the beam failure indicator comprising the non-binary value.

Aspect 11: The method of any of aspects 6 through 10, further comprising: identifying, at the physical layer, a type of the beam failure indicator based at least in part on the selected one or more criteria, wherein sending the indication comprises sending the type of the beam failure indicator.

Aspect 12: The method of aspect 11, wherein identifying the type of the beam failure indicator comprises: identifying the type of the beam failure indicator using a machine learning algorithm taking the measurements performed on the one or more beam failure detection reference signals as inputs and generating the type of the beam failure indicator as an output.

Aspect 13: The method of any of aspects 11 through 12, wherein the type of the beam failure indicator comprises a first type of beam failure indicator associated with a signal condition of the beam or a second type of beam failure indicator associated with interference applied to the beam.

Aspect 14: The method of aspect 13, wherein the first type of beam failure indicator indicates a strength of a channel between the UE and the base station; and the second type of beam failure indicator indicates interference between the UE and the base station.

Aspect 15: The method of any of aspects 1 through 14, wherein sending the indication comprises: sending, from the physical layer to the medium access control layer, the measurements performed on the one or more beam failure detection reference signals.

Aspect 16: The method of aspect 15, further comprising: determining, at the medium access control layer, a beam failure indicator for the beam based at least in part on the measurements received from the physical layer.

Aspect 17: The method of aspect 16, wherein determining the beam failure indicator comprises: determining the beam failure indicator using a machine learning algorithm taking the measurements received from the physical layer as inputs and generating the beam failure indicator as an output.

Aspect 18: The method of any of aspects 16 through 17, wherein determining the beam failure indicator comprises: determining whether the measurements satisfy the one or more criteria, the beam failure indicator comprising a binary value indicating whether the measurements satisfy the one or more criteria.

Aspect 19: The method of any of aspects 16 through 18, wherein determining the beam failure indicator comprises: determining a value for each measurement of the measurements compared with the one or more criteria; and determining a non-binary value based at least in part on the value for each measurement of the measurements compared with the one or more criteria, the beam failure indicator comprising the non-binary value.

Aspect 20: The method of any of aspects 16 through 19, further comprising: identifying, at the medium access control layer, a type of the beam failure indicator based at least in part on the selected one or more criteria.

Aspect 21: The method of aspect 20, wherein identifying the type of the beam failure indicator comprises: identifying the type of the beam failure indicator using a machine learning algorithm taking the measurements received from the physical layer as input and generating the type of the beam failure indicator as an output.

Aspect 22: The method of any of aspects 20 through 21, wherein the type of the beam failure indicator comprises a first type of beam failure indicator associated with a signal condition of the beam or a second type of beam failure indicator associated with interference applied to the beam.

Aspect 23: The method of aspect 22, wherein the first type of beam failure indicator indicates a strength of a channel between the UE and the base station; and the second type of beam failure indicator indicates interference between the UE and the base station.

Aspect 24: A method for wireless communication at a base station, comprising: transmitting, to a UE, an indication of a level of autonomy with which the UE is to manage beam failure detection operations; transmitting, to the UE, one or more beam failure detection reference signals associated with a beam used for communications with the UE; and receiving, from the UE, a beam failure report based at least in part on transmitting the indication of the level of autonomy and the one or more beam failure detection reference signals.

Aspect 25: The method of aspect 24, further comprising: receiving, from the UE, an indication of a capability of the UE for applying one or more criteria to detect beam failure, wherein transmitting the indication of the level of autonomy is based at least in part on the capability of the UE.

Aspect 26: The method of any of aspects 24 through 25, wherein transmitting the indication of the level of autonomy comprises: transmitting the indication of the level of autonomy via downlink control information or a medium access control control element.

Aspect 27: An apparatus for wireless communication at a UE, comprising a processor; memory coupled with the processor; and instructions stored in the memory and executable by the processor to cause the apparatus to perform a method of any of aspects 1 through 23.

Aspect 28: An apparatus for wireless communication at a UE, comprising at least one means for performing a method of any of aspects 1 through 23.

Aspect 29: A non-transitory computer-readable medium storing code for wireless communication at a UE, the code comprising instructions executable by a processor to perform a method of any of aspects 1 through 23.

Aspect 30: An apparatus for wireless communication at a base station, comprising a processor; memory coupled with the processor; and instructions stored in the memory and executable by the processor to cause the apparatus to perform a method of any of aspects 24 through 26.

Aspect 31: An apparatus for wireless communication at a base station, comprising at least one means for performing a method of any of aspects 24 through 26.

Aspect 32: A non-transitory computer-readable medium storing code for wireless communication at a base station, the code comprising instructions executable by a processor to perform a method of any of aspects 24 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   selecting, by the UE, one or more criteria for detecting beam failure of a beam associated with the UE, the UE supporting multiple levels of autonomy comprising a first level of autonomy and a second level of autonomy to manage beam failure detection operations;
   performing measurements on one or more beam failure detection reference signals received from a network device and associated with the beam associated at least in part with the selected one or more criteria; and
   sending, from a physical layer at the UE to a medium access control layer at the UE, an indication used to identify beam failure associated at least in part with the measurements performed on the one or more beam failure detection reference signals.

2. The method of claim 1, further comprising:
   receiving, from the network device, an indication of a level of the multiple levels autonomy with which the UE is to manage the beam failure detection operations.

3. The method of claim 2, wherein receiving the indication of the level of autonomy comprises:
   receiving the indication of the level of autonomy via downlink control information or a medium access control element.

4. The method of claim 2, further comprising:
   transmitting, to the network device, an indication of a capability of the UE for applying the one or more criteria to the measurements to detect beam failure, the indication of the level of autonomy being associated at least in part with the capability of the UE.

5. The method of claim 1, wherein selecting the one or more criteria for detecting beam failure comprises:
   selecting one or more thresholds associated with a signal-to-interference-plus-noise ratio, one or more thresholds associated with a signal-to-noise ratio, one or more thresholds associated with a reference signal received power parameter, one or more thresholds associated with a received signal strength indicator, one or more thresholds associated with a pathloss parameter, or one or more thresholds associated with an interference parameter for detecting the beam failure, or any combination of thresholds thereof for any combination of parameters thereof.

6. The method of claim 1, wherein sending the indication used to identify the beam failure comprises:
   sending, from the physical layer to the medium access control layer, a beam failure indicator associated at least in part with the measurements performed on the one or more beam failure detection reference signals satisfying the one or more criteria.

7. The method of claim 6, further comprising:
   determining, at the physical layer, the beam failure indicator for the beam associated at least in part with the measurements performed on the one or more beam failure detection reference signals satisfying the one or more criteria, the beam failure indicator being associated at least in part with the determining.

8. The method of claim 7, wherein determining the beam failure indicator comprises:
   determining the beam failure indicator using a machine learning algorithm taking the measurements performed on the one or more beam failure detection reference signals as inputs and generating the beam failure indicator as an output.

9. The method of claim 7, wherein determining the beam failure indicator comprises:
   determining whether the measurements satisfy the one or more criteria, the beam failure indicator comprising a binary value indicating whether the measurements satisfy the one or more criteria.

10. The method of claim 7, wherein determining the beam failure indicator comprises:
    determining a value for each measurement of the measurements compared with the one or more criteria; and
    determining a non-binary value associated at least in part with the value for each measurement of the measurements compared with the one or more criteria, the beam failure indicator comprising the non-binary value.

11. The method of claim 6, further comprising:
    identifying, at the physical layer, a type of the beam failure indicator associated at least in part with the selected one or more criteria, the indication used to identify the beam failure comprises sending the type of the beam failure indicator.

12. The method of claim 11, wherein identifying the type of the beam failure indicator comprises:
    identifying the type of the beam failure indicator using a machine learning algorithm taking the measurements performed on the one or more beam failure detection reference signals as inputs and generating the type of the beam failure indicator as an output.

13. The method of claim 11, wherein the type of the beam failure indicator comprises a first type of beam failure indicator associated with a signal condition of the beam or a second type of beam failure indicator associated with interference applied to the beam.

14. The method of claim 13, wherein:
    the first type of beam failure indicator indicates a strength of a channel between the UE and the network device; and
    the second type of beam failure indicator indicates interference between the UE and the network device.

15. The method of claim 1, wherein sending the indication comprises:
    sending, from the physical layer to the medium access control layer, the measurements performed on the one or more beam failure detection reference signals.

16. The method of claim 15, further comprising:
    determining, at the medium access control layer, a beam failure indicator for the beam associated at least in part with the measurements received from the physical layer.

17. The method of claim 16, wherein determining the beam failure indicator comprises:

determining the beam failure indicator using a machine learning algorithm taking the measurements received from the physical layer as inputs and generating the beam failure indicator as an output.

18. The method of claim 16, wherein determining the beam failure indicator comprises:
determining whether the measurements satisfy the one or more criteria, the beam failure indicator comprising a binary value indicating whether the measurements satisfy the one or more criteria.

19. The method of claim 16, wherein determining the beam failure indicator comprises:
determining a value for each measurement of the measurements compared with the one or more criteria; and
determining a non-binary value associated at least in part with the value for each measurement of the measurements compared with the one or more criteria, the beam failure indicator comprising the non-binary value.

20. The method of claim 16, further comprising:
identifying, at the medium access control layer, a type of the beam failure indicator associated at least in part with the selected one or more criteria.

21. The method of claim 20, wherein identifying the type of the beam failure indicator comprises:
identifying the type of the beam failure indicator using a machine learning algorithm taking the measurements received from the physical layer as input and generating the type of the beam failure indicator as an output.

22. The method of claim 20, wherein the type of the beam failure indicator comprises a first type of beam failure indicator associated with a signal condition of the beam or a second type of beam failure indicator associated with interference applied to the beam.

23. The method of claim 22, wherein:
the first type of beam failure indicator indicates a strength of a channel between the UE and the network device; and
the second type of beam failure indicator indicates interference between the UE and the network device.

24. A method for wireless communication at a network device, comprising:
transmitting, to a user equipment (UE), an indication of a level of autonomy of multiple levels of autonomy with which the UE is to manage beam failure detection operations, the UE supporting multiple levels of autonomy comprising a first level of autonomy and a second level of autonomy;
transmitting, to the UE, one or more beam failure detection reference signals associated with a beam used for communications with the UE; and
receiving, from the UE, a beam failure report associated at least in part with transmitting the indication of the level of autonomy and the one or more beam failure detection reference signals.

25. The method of claim 24, further comprising:
receiving, from the UE, an indication of a capability of the UE for applying one or more criteria to detect beam failure, the indication of the level of autonomy being associated at least in part with the capability of the UE.

26. The method of claim 24, wherein transmitting the indication of the level of autonomy comprises:
transmitting the indication of the level of autonomy via downlink control information or a medium access control element.

27. An apparatus for wireless communication at a user equipment (UE), comprising:
a processor;
memory coupled with the processor; and
instructions stored in the memory and operable, when executed by the processor, to cause the apparatus to:
select, by the UE, one or more criteria to detect beam failure of a beam associated with the UE, the UE supporting multiple levels of autonomy comprising a first level of autonomy and a second level of autonomy to manage beam failure detection operations;
perform measurements on one or more beam failure detection reference signals received from a network device and associated with the beam associated at least in part with the selected one or more criteria; and
send, from a physical layer at the UE to a medium access control layer at the UE, an indication used to identify beam failure associated at least in part with the measurements performed on the one or more beam failure detection reference signals.

28. The apparatus of claim 27, wherein the instructions are further executable by the processor to cause the apparatus to:
receive, from the network device, an indication of a level of autonomy of the multiple levels of autonomy with which the UE is to manage the beam failure detection operations.

29. The apparatus of claim 27, wherein the instructions to send the indication used to identify the beam failure are executable by the processor to cause the apparatus to:
send, from the physical layer to the medium access control layer, a beam failure indicator associated at least in part with the measurements performed on the one or more beam failure detection reference signals satisfying the one or more criteria.

30. An apparatus for wireless communication at a network device, comprising:
a processor;
memory coupled with the processor; and
instructions stored in the memory and operable, when executed by the processor, to cause the apparatus to:
transmit, to a user equipment (UE), an indication of a level of autonomy with which the UE is to manage beam failure detection operations, the UE supporting multiple levels of autonomy comprising a first level of autonomy and a second level of autonomy;
transmit, to the UE, one or more beam failure detection reference signals associated with a beam used for communications with the UE; and
receive, from the UE, a beam failure report associated at least in part with transmitting the indication of the level of autonomy and the one or more beam failure detection reference signals.

* * * * *